(12) United States Patent
Jang et al.

(10) Patent No.: US 10,235,945 B2
(45) Date of Patent: Mar. 19, 2019

(54) APPARATUS AND METHOD FOR CONTROLLING DISPLAY IN ELECTRONIC DEVICE HAVING PROCESSORS

(71) Applicant: Samsung Electronics Co., Ltd., Suwon-si, Gyeonggi-do (KR)

(72) Inventors: DongJun Jang, Suwon-si (KR); Yongman Lee, Seongnam-si (KR); Daehyun Yoo, Yongin-si (KR); Jaehun Cho, Suwon-si (KR); Jaewon Choi, Suwon-si (KR); Soohyung Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 157 days.

(21) Appl. No.: 15/051,867

(22) Filed: Feb. 24, 2016

(65) Prior Publication Data

US 2016/0247306 A1  Aug. 25, 2016

(30) Foreign Application Priority Data

Feb. 24, 2015 (KR) .......................... 10-2015-0025763

(51) Int. Cl.
    *G09G 3/34* (2006.01)
(52) U.S. Cl.
    CPC ..... *G09G 3/3406* (2013.01); *G09G 2330/021* (2013.01)
(58) Field of Classification Search
    CPC .......................... G09G 2330/021; G06T 11/60
    See application file for complete search history.

(56) References Cited

U.S. PATENT DOCUMENTS

| | | | | |
|---|---|---|---|---|
| 5,715,331 A | * | 2/1998 | Hollinger | ................ G06T 3/403 382/199 |
| 5,889,480 A | * | 3/1999 | Kim | .......................... G06F 3/05 341/50 |
| 5,926,187 A | * | 7/1999 | Kim | ......................... G09G 5/14 345/619 |
| 6,606,103 B1 | * | 8/2003 | Hamlet | ................. G06F 9/4443 345/443 |
| 8,234,512 B2 | | 7/2012 | Mucignat et al. | |

(Continued)

FOREIGN PATENT DOCUMENTS

| | | |
|---|---|---|
| JP | 2011-139301 A | 7/2011 |
| KR | 10-0748984 B1 | 8/2007 |
| KR | 10-1341044 B1 | 12/2013 |

*Primary Examiner* — Jeffery A Brier
(74) *Attorney, Agent, or Firm* — Jefferson IP Law, LLP

(57) ABSTRACT

An apparatus and a method for controlling a display so as to reduce power consumption in an electronic device having a plurality of processors are provided. The apparatus includes a display and a control unit. The display is configured to display information formed by a first image and a second image. The first image corresponds to a partial region of the information, and the second image corresponds to a background region of the information. The control unit includes a first processor and a second processor. The processor may be configured to transmit the first image to the second processor in response to a request for displaying the information on the display. The second processor may be configured to store the second image in a memory and control the display to display the received first image together with the second image.

19 Claims, 25 Drawing Sheets

(56) References Cited

U.S. PATENT DOCUMENTS

| | | | |
|---|---|---|---|
| 2006/0061595 A1* | 3/2006 | Goede | G06F 17/241 |
| | | | 345/619 |
| 2007/0057865 A1* | 3/2007 | Song | G06F 3/1431 |
| | | | 345/1.1 |
| 2008/0232638 A1* | 9/2008 | Tompkins | G06T 11/60 |
| | | | 382/100 |
| 2009/0259865 A1 | 10/2009 | Sheynblat et al. | |
| 2010/0277429 A1* | 11/2010 | Day | G06F 3/0416 |
| | | | 345/173 |
| 2010/0313050 A1 | 12/2010 | Harrat et al. | |
| 2011/0071759 A1 | 3/2011 | Pande et al. | |
| 2012/0327061 A1* | 12/2012 | Sirpal | G06F 1/1616 |
| | | | 345/211 |
| 2013/0021229 A1* | 1/2013 | Ludden | G09G 3/3688 |
| | | | 345/89 |
| 2013/0057763 A1* | 3/2013 | Cha | G09G 5/006 |
| | | | 348/554 |
| 2015/0033047 A1* | 1/2015 | Byun | G09G 5/006 |
| | | | 713/320 |
| 2015/0304675 A1* | 10/2015 | Jacobson | H04N 19/50 |
| | | | 375/240.12 |
| 2016/0180796 A1* | 6/2016 | Morein | G06T 11/60 |
| | | | 345/629 |

\* cited by examiner

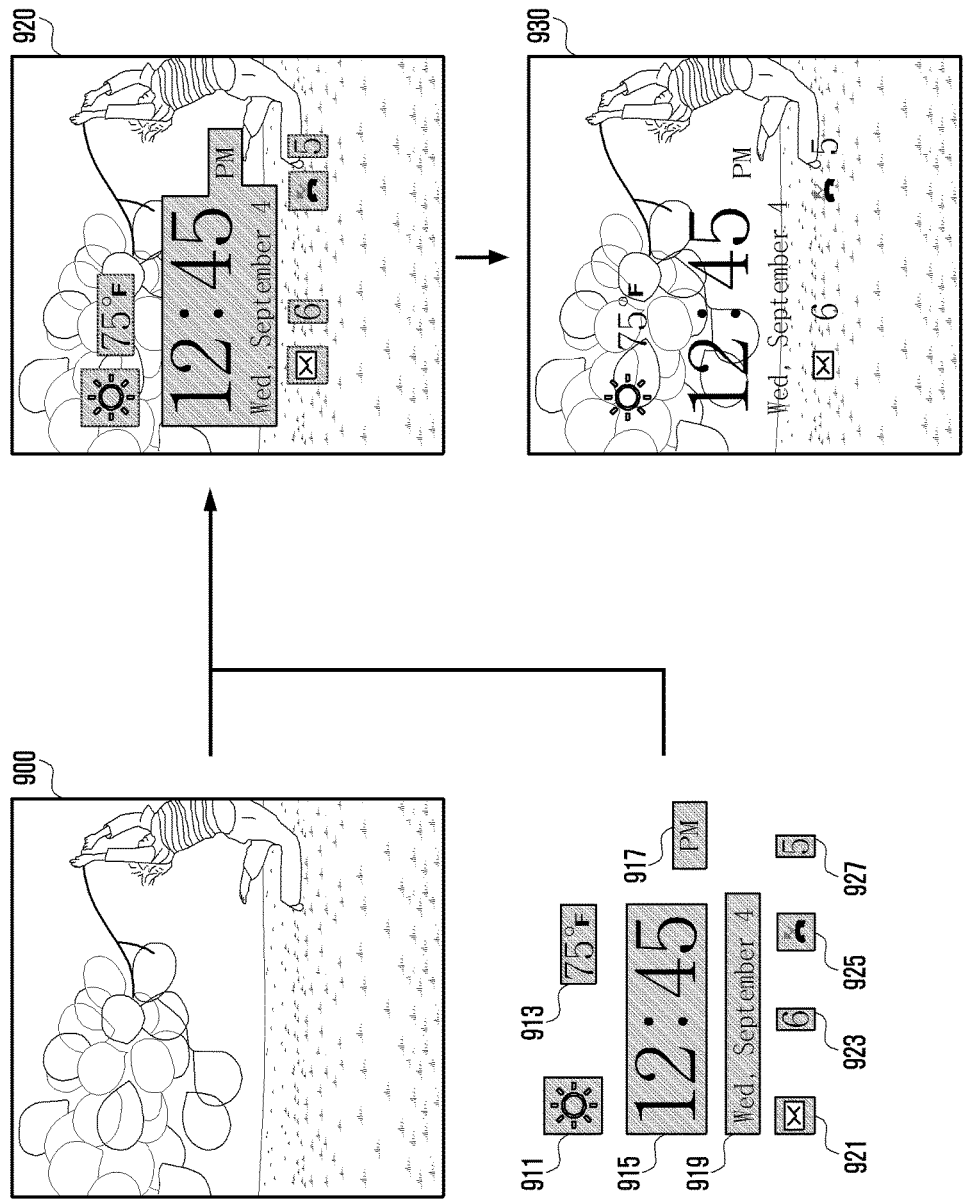

APPARATUS AND METHOD FOR CONTROLLING DISPLAY IN ELECTRONIC DEVICE HAVING PROCESSORS

CROSS-REFERENCE TO RELATED APPLICATION(S)

This application claims the benefit under 35 U.S.C. § 119(a) of a Korean patent application filed on Feb. 24, 2015 in the Korean Intellectual Property Office and assigned Serial number 10-2015-0025763, the entire disclosure of which is hereby incorporated by reference.

TECHNICAL FIELD

The present disclosure relates to an apparatus and method for controlling a display to reduce power consumption in an electronic device having a plurality of processors.

BACKGROUND

When an electronic device executes a function, the electronic device may display a specific screen associated with the function. For example, the electronic device having a camera function may display a captured image. In this case, a user often desires that the captured image will be displayed with high resolution. Also, a user may request to display the screen for a long time.

When displaying a screen, an application processor (AP) may drive the display by using a high power resource. However, if the display is turned on for a long period of time, too much power may be consumed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for controlling a display to consume less power while a screen is activated for a long period of time.

Another aspect of the present disclosure is to provide a method and apparatus for controlling a display by using a separate processor which operates to minimize use of high-power resources.

In accordance with an aspect of the present disclosure, an apparatus for controlling a display in an electronic device is provided. The apparatus includes a display configured to display information formed by a first image and a second image, the first image corresponding to a partial region of the information, and the second image corresponding to a background region of the information, and a control unit including a first processor and a second processor. In this apparatus, the first processor may be configured to transmit the first image to the second processor in response to a request for displaying the information on the display. Also, the second processor may be configured to store the second image in a memory and control the display to display the received first image together with the second image.

In accordance with another aspect of the present disclosure, a method for controlling a display in an electronic device is provided. The method includes operations of receiving a request for displaying information formed of a first image and a second image, the first image corresponding to a partial region of the information, and the second image corresponding to a background region of the information, in response to the request, transmitting the first image, storing the second image in a memory, and displaying the first image together with the second image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 9A to 9F are screenshots of methods for controlling a display of an electronic device according to various embodiments of the present disclosure.

Throughout the drawings, like reference numerals will be understood to refer to like parts, components, and structures.

DETAILED DESCRIPTION

Figure 1:
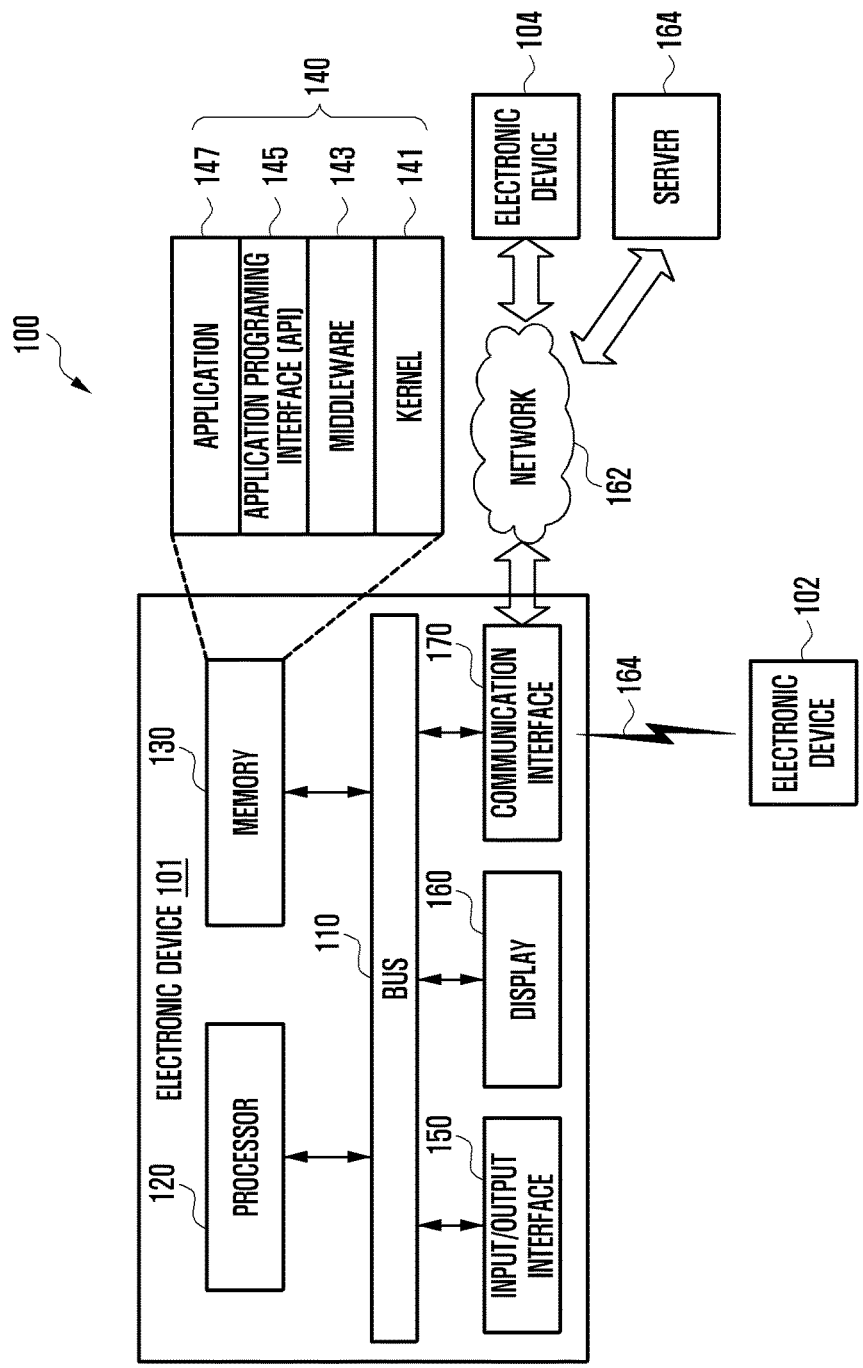
FIG. 1 is a diagram of a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" may denote the presence of the disclosed functions, operations, and constituent elements and do not limit one or more additional functions, operations, and constituent elements. Terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween.

An electronic device according to the present disclosure may include a communication function. For example, the device corresponds to a combination of at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a Television (TV), a digital versatile disc (DVD) player, an audio device, various medical devices (for example, magnetic resonance angiography (MRA), magnetic resonance imaging (MRI), computed tomography (CT), a scanning machine, a ultrasonic wave device, or the like), a navigation device, a global positioning system (GPS) receiver, an event data recorder (EDR), a flight data recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

FIG. 1 is a block diagram of a network environment including an electronic device according to an embodiment of the present disclosure.

Referring to FIG. 1, a network environment 100 may include an electronic device 101 configured to communicate with various other devices, such as electronic device 102, electric device 104, and server 164. The electronic device 101 may include a bus 110, a processor 120, a memory 130, a software modules 140, an input/output interface 150, a display module 160, a communication interface 170, and other similar and/or suitable components.

The bus 110 may be a circuit which interconnects the above-described elements and delivers a communication (e.g., a control message) between the above-described elements.

The processor 120 may receive commands from the above-described other elements (e.g., the memory 130, the input/output interface 150, the display 160, the communication interface 170, etc.) through the bus 110, may interpret the received commands, and may execute calculation or data processing according to the interpreted commands.

The memory 130 may store commands or data received from the processor 120 or other elements (e.g., the input/output interface 150, the display 160, the communication interface 170, etc.) or generated by the processor 120 or the other elements. The memory 130 may include the software modules 140, such as a kernel 141, middleware 143, an application programming interface (API) 145, at least one application 147, and the like. Each of the above-described programming modules may be implemented in software, firmware, hardware, or a combination of two or more thereof.

The kernel 141 may control or manage system resources (e.g., the bus 110, the processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 101 can be used, to at least one of the one or more applications 147.

The API 145 is an interface through which the application 147 is capable of controlling a function provided by the kernel 141 or the middleware 143, and may include, for example, at least one interface or function for file control, window control, image processing, character control, or the like.

The input/output interface 150, for example, may receive a command or data as input from a user, and may deliver the received command or data to the processor 120 or the memory 130 through the bus 110. The display 160 may display a video, an image, data, or the like to the user.

The communication interface 170 may connect communication between the electronic device 102 and the electronic device 101. The communication interface 170 may support a predetermined short-range communication protocol (e.g., Wi-Fi, Bluetooth® (BT), and near field communication (NFC)), or a predetermined network communication 162 (e.g., the Internet, a local area network (LAN), a wide area network (WAN), a telecommunication network, a cellular network, a satellite network, a plain old telephone service (POTS), or the like). Each of the electronic devices 102 and 104 may be identical (e.g., of an identical type) to or different (e.g., of a different type) from the electronic device 101. Further, the communication interface 170 may connect communication between the server 164 and the electronic device 101 via the network 162.

Figure 2:
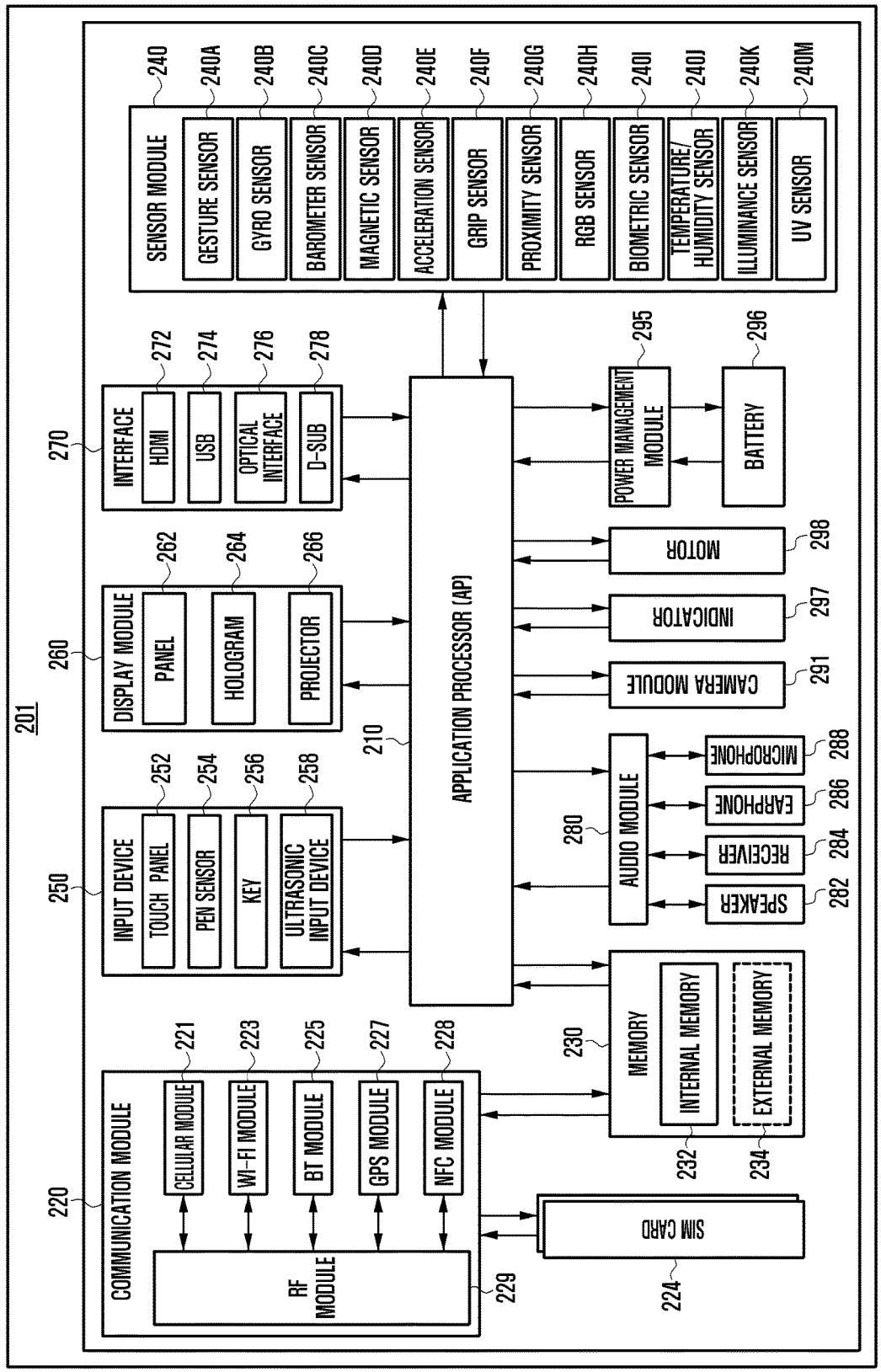
FIG. 2 is a block diagram of an electronic device according to various embodiments of the present disclosure.

FIG. 2 is a block diagram of an electronic device according to an embodiment of the present disclosure.

The electronic device 201 may be, for example, the electronic device 101 illustrated in FIG. 1.

Referring to FIG. 2, the electronic device may include an application processor (AP) 210, a communication module 220, a subscriber identification module (SIM) card 224, a memory 230, a sensor module 240, a input device 250, a display module 260, an interface 270, an audio module 280, a camera module 291, a power management module 295, a battery 296, an indicator 297, a motor 298 and any other similar and/or suitable components.

The application processor (AP) 210 (e.g., the processor 120) may include one or more APs, or one or more communication processors (CPs). The processor 210 may be, for example, the processor 120 illustrated in FIG. 1. The AP 210 is illustrated as being included in the processor 210 in FIG. 2, but may be included in different integrated circuit (IC) packages, respectively. According to an embodiment of the present disclosure, the AP 210 may be included in one IC package.

The AP 210 may execute an operating system (OS) or an application program, and thereby may control multiple hardware or software elements connected to the AP 210 and may perform processing of and arithmetic operations on various data including multimedia data. The AP 210 may be implemented by, for example, a system on chip (SoC). According to an embodiment of the present disclosure, the AP 210 may further include a graphical processing unit (GPU) (not illustrated).

The AP 210 may manage a data line and may convert a communication protocol in the case of communication between the electronic device 201 (e.g., the electronic device 101) and different electronic devices. The AP 210 may be implemented by, for example, an SoC. According to an embodiment of the present disclosure, the AP 210 may perform at least some of multimedia control functions. The AP 210, for example, may distinguish and authenticate a terminal in a communication network by using a SIM (e.g., the SIM card 224). Also, the AP 210 may provide the user with services, such as a voice telephony call, a video telephony call, a text message, packet data, and the like.

Further, the AP 210 may control the transmission and reception of data by the communication module 220. In FIG. 2, the elements such as the AP 220, the power management module 295, the memory 230, and the like are illustrated as elements separate from the AP 210. However, according to an embodiment of the present disclosure, the AP 210 may include at least some (e.g., the CP) of the above-described elements.

According to an embodiment of the present disclosure, the AP 210 may load, to a volatile memory, a command or data received from at least one of a non-volatile memory and other elements connected to the AP 210, and may process the loaded command or data. Also, the AP 210 may store, in a non-volatile memory, data received from or generated by at least one of the other elements.

The SIM card 224 may be a card implementing a subscriber identification module, and may be inserted into a slot formed in a particular portion of the electronic device 101. The SIM card 224 may include unique identification information (e.g., IC card identifier (ICCID)) or subscriber information (e.g., international mobile subscriber identity (IMSI)).

The memory 230 may include an internal memory 232 and an external memory 234. The memory 230 may be, for example, the memory 130 illustrated in FIG. 1. The internal memory 232 may include, for example, at least one of a volatile memory (e.g., a dynamic random access memory (DRAM), a static RAM (SRAM), a synchronous DRAM (SDRAM), etc.), and a non-volatile memory (e.g., a one time programmable read only memory (OTPROM), a PROM, an erasable and programmable ROM (EPROM), an electrically erasable and programmable ROM (EEPROM), a mask ROM, a flash ROM, a NAND flash memory, a NOR flash memory, etc.). According to an embodiment of the present disclosure, the internal memory 232 may be in the form of a solid state drive (SSD). The external memory 234 may further include a flash drive, for example, a compact flash (CF), a secure digital (SD), a micro-SD, a mini-SD, an extreme digital (xD), a memory stick, or the like.

The communication module 220 may include a cellular module 221, a wireless communication module 223 or a radio frequency (RF) module 229. The communication module 220 may be, for example, the communication interface 170 illustrated in FIG. 1. The communication module 220 may include, for example, a wireless fidelity (Wi-Fi) module 223, a BT module 225, a GPS module 227, or an NFC module 228. For example, the wireless communication module 220 may provide a wireless communication function by using a radio frequency. Additionally or alternatively, the wireless communication module 220 may include a network interface (e.g., a LAN card), a modulator/demodulator (modem), or the like for connecting the electronic device 201 to a network (e.g., the Internet, a LAN, a WAN, a telecommunication network, a cellular network, a satellite network, a POTS, or the like).

The RF module 229 may be used for transmission and reception of data, for example, transmission and reception of RF signals. Although not illustrated, the RF unit 229 may include, for example, a transceiver, a power amplifier module (PAM), a frequency filter, a low noise amplifier (LNA), or the like. Also, the RF module 229 may further include a component for transmitting and receiving electromagnetic waves in a free space in a wireless communication, for example, a conductor, a conductive wire, or the like.

The sensor module 240 may include, for example, at least one of a gesture sensor 240A, a gyro sensor 240B, an barometer sensor 240C, a magnetic sensor 240D, an acceleration sensor 240E, a grip sensor 240F, a proximity sensor 240G, a red, green, and blue (RGB) sensor 240H, a biometric sensor 240I, a temperature/humidity sensor 240J, an illuminance sensor 240K, and an ultraviolet (UV) sensor 240M. The sensor module 240 may measure a physical quantity or may sense an operating state of the electronic device 101, and may convert the measured or sensed information to an electrical signal. Additionally/alternatively, the sensor module 240 may include, for example, an E-nose sensor (not illustrated), an electromyography (EMG) sensor (not illustrated), an electroencephalogram (EEG) sensor (not illustrated), an electrocardiogram (ECG) sensor (not illustrated), a fingerprint sensor (not illustrated), and the like. The sensor module 240 may further include a control circuit (not illustrated) for controlling one or more sensors included therein.

The input device 250 may include a touch panel 252, a pen sensor 254 (e.g., a digital pen sensor), keys 256, and an ultrasonic input unit 258. The input device 250 may be, for example, the input/output interface 150 illustrated in FIG. 1. The touch panel 252 may recognize a touch input in at least one of, for example, a capacitive scheme, a resistive scheme, an infrared scheme, and an acoustic wave scheme. Also, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of wireless recognition. According to an embodiment of the present disclosure, the electronic device 201 may receive a user input from an external device (e.g., a network, a computer, or a server) through the communication module 220.

The display module 260 may include a panel 262, a hologram 264, or projector 266. The display module 260 may be, for example, the display 160 illustrated in FIG. 1. The panel 262 may be, for example, a liquid crystal display (LCD) and an active matrix organic light emitting diode (AM-OLED) display, and the like. The panel 262 may be implemented so as to be, for example, flexible, transparent, or wearable. The panel 262 may include the touch panel 252. The hologram 264 may display a three-dimensional image in the air by using interference of light. According to an embodiment of the present disclosure, the display module 260 may further include a control circuit for controlling the panel 262 or the hologram 264.

The interface 270 may include, for example, a high-definition multimedia interface (HDMI) 272, a universal serial bus (USB) 274, an optical interface 276, and a D-subminiature (D-sub) 278. Additionally or alternatively, the interface 270 may include, for example, SD/multi-media card (MMC) (not illustrated) or infrared data association (IrDA) (not illustrated).

The audio module 280 may bidirectionally convert between a voice and an electrical signal. The audio module 280 may convert voice information, which is input to or output from the audio module 280, through, for example, a speaker 282, a receiver 284, an earphone 286, the microphone 288 or the like.

The camera module 291 may capture an image and a moving image. According to an embodiment of the present disclosure, the camera module 291 may include one or more image sensors (e.g., a front lens or a back lens), an image signal processor (ISP) (not illustrated), and a flash LED (not illustrated).

The power management module 295 may manage power of the hardware 200. Although not illustrated, the power management module 295 may include, for example, a power management IC (PMIC), a charger IC, or a battery fuel gauge.

The PMIC may be mounted to, for example, an IC or an SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be added in order to perform the wireless charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states or a part (e.g., the AP 211) of the electronic device 201, for example, a booting state, a message state, a charging state and the like. The motor 298 may convert an electrical signal into a mechanical vibration. The processor 210 may control the sensor module 240.

Although not illustrated, the electronic device 201 may include a processing unit (e.g., a GPU) for supporting a module TV. The processing unit for supporting a module TV may process media data according to standards such as, for example, digital multimedia broadcasting (DMB), digital video broadcasting (DVB), media flow, and the like. Each of the above-described elements of the electronic device 201 according to an embodiment of the present disclosure may include one or more components, and the name of the relevant element may change depending on the type of electronic device. The electronic device 201 according to an embodiment of the present disclosure may include at least one of the above-described elements. Some of the above-described elements may be omitted from the electronic device 201, or the electronic device 201 may further include additional elements. Also, some of the elements of the electronic device 201 according to an embodiment of the present disclosure may be combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an application-specific IC (ASIC) chip, a field-programmable gate array (FPGA), and a programmable-logic device for performing certain operations which have been known or are to be developed in the future.

Figure 3:
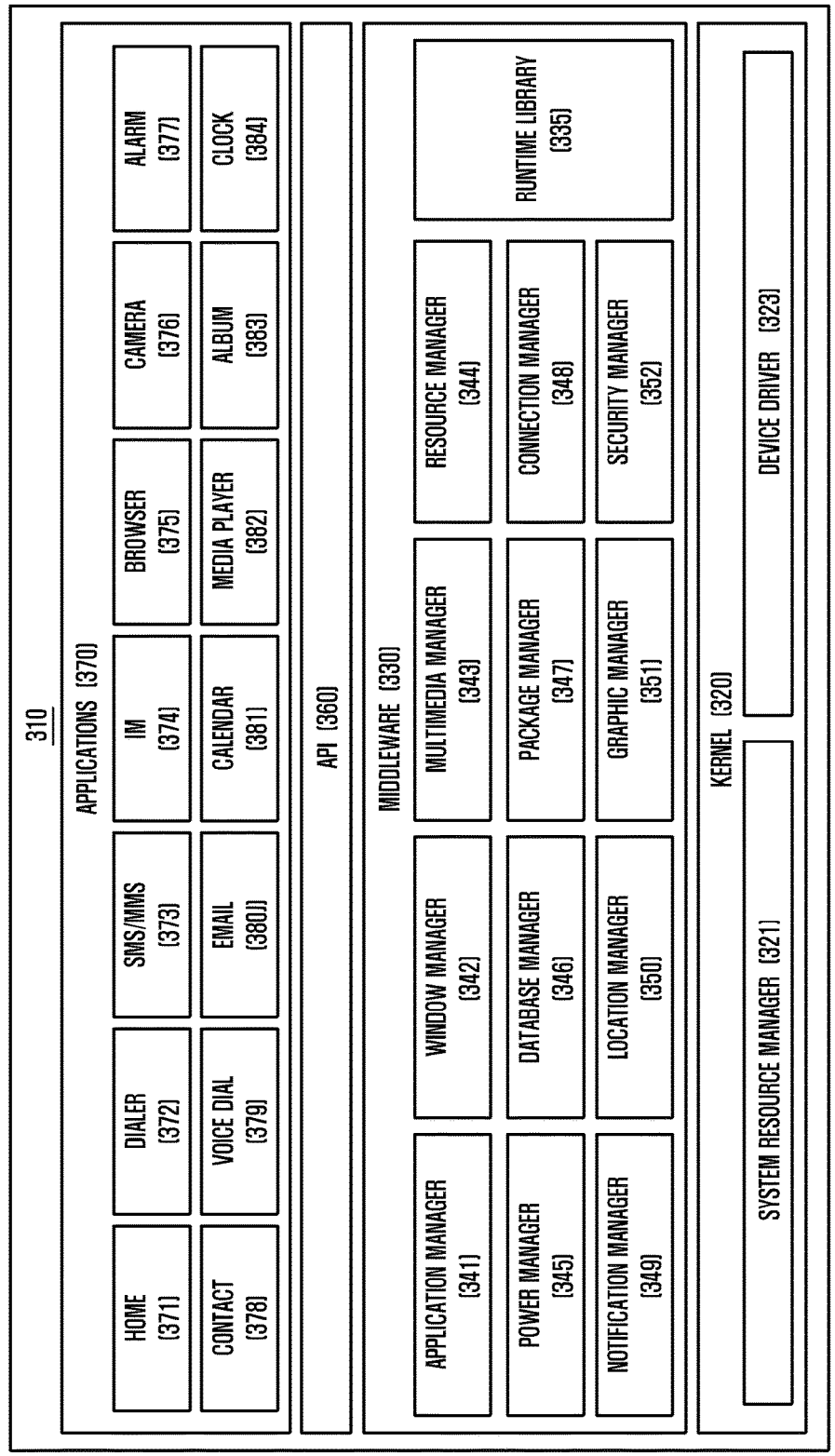
FIG. 3 is a block diagram of a program module according to various embodiments of the present disclosure.

FIG. 3 is a block diagram of a software module according to an embodiment of the present disclosure.

Referring to FIG. 3, a software module 310 may be included (or stored) in the electronic device 101 (e.g., the memory 130) or may be included (or stored) in the electronic device 201 (e.g., the memory 230). At least a part of the software module 310 may be implemented in software, firmware, hardware, or a combination of two or more thereof. The software module 310 may be implemented in hardware (e.g., the electronic device 201), and may include an OS controlling resources and/or various applications (e.g., an application 370) executed in the OS. For example, the OS may be Android®, iOS®, Windows®, Symbian®, Tizen®, Bada®, and the like.

Referring to FIG. 3, the software module 310 may include a kernel 320, a middleware 330, an API 360, and/or applications 370.

The kernel 320 (e.g., the kernel 141) may include a system resource manager 321 and/or a device driver 322. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 322 may include, for example, a display driver (not illustrated), a camera driver (not illustrated), a BT driver (not illustrated), a shared memory driver (not illustrated), a USB driver (not illustrated), a keypad driver (not illustrated), a Wi-Fi driver (not illustrated), and/or an audio driver (not illustrated). Also, the device driver 322 may include an inter-process communication (IPC) driver (not illustrated).

The middleware 330 may include modules to provide a function used in common by the applications 370. Also, the middleware 330 may provide a function to the applications 370 through the API 360 to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, to add a new function by using a programming language during the execution of the applications 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and BT. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs to provide differentiated functions. Also, the middleware 330 may dynamically delete existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the application 147) may include, for example, a preloaded application and/or a third party application. The applications 370 (e.g., the application 147) may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the software module 310 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 220. At least a part of the software module 310 may be implemented (e.g., executed) by, for example, the one or more processors 210. At least a part of the software module 310 may include, for example, a module, a program, a routine, a set of instructions, and/or a process for performing one or more functions.

Names of the elements of the programming module (e.g., the software module 310) according to an embodiment of the present disclosure may change depending on the type of OS. The programming module may include one or more of the above-described elements. Alternatively, some of the above-described elements may be omitted from the programming module. Alternatively, the programming module may further include additional elements. The operations performed by the programming module or other elements may be processed in a sequential method, a parallel method, a repetitive method, or a heuristic method. Also, some of the operations may be omitted, or other operations may be added to the operations.

Figure 4:
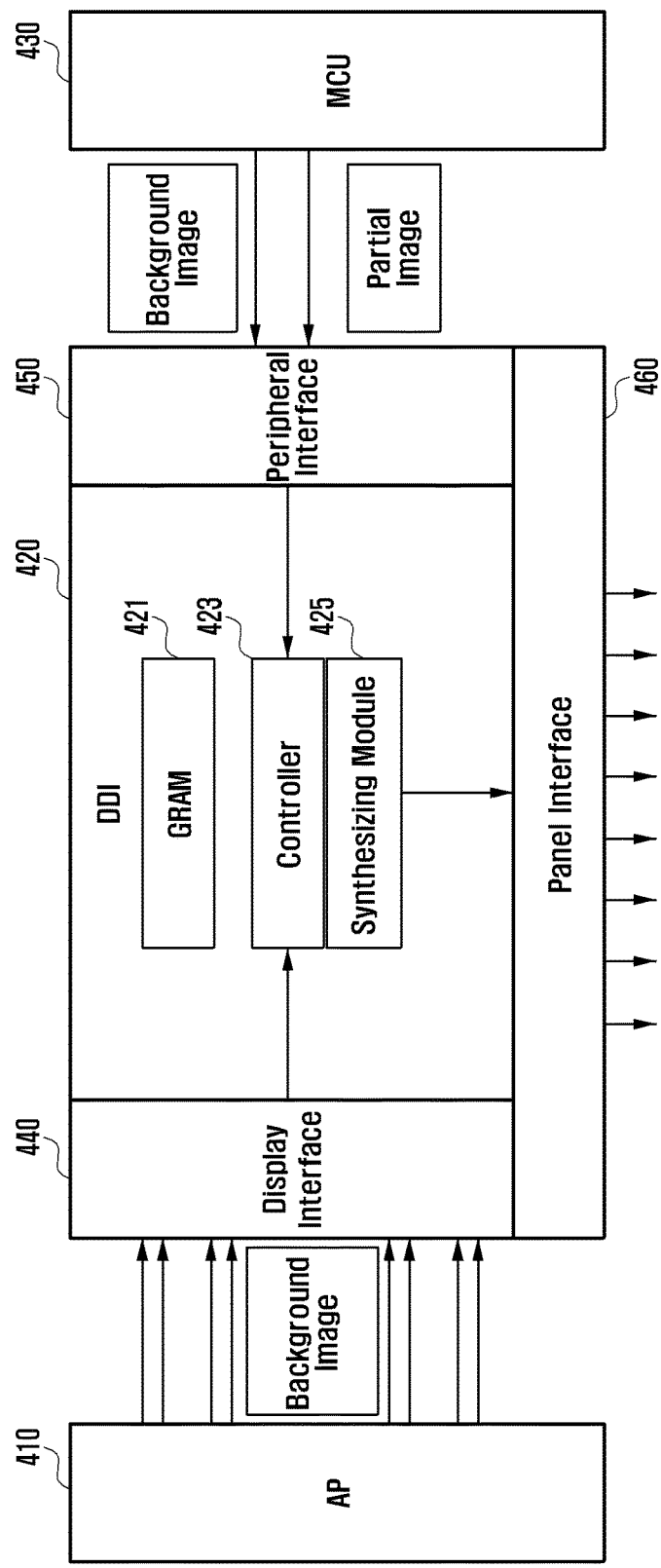
FIG. 4 is a block diagram of an electronic device for controlling a display according to various embodiments of the present disclosure.

FIG. 4 is a block diagram of an electronic device for controlling a display according to various embodiments of the present disclosure.

Referring to FIG. 4, the electronic device may be configured to include an AP 410, a display driver IC (DDI) 420, a microcontroller unit (MCU) 430, a display interface 440, a peripheral interface 450, and a panel interface 460.

According to an embodiment of the present disclosure, the AP 410 may be a processor for processing a main function. The AP 410 may transmit a background image to the DDI 420 through the display interface 440. For example, the display interface 440 may be a mobile industry processor interface (MIPI), an electronic data processing (EDP), or the like. The background image may be part of a screen that is displayed by the electronic device. For example, when the electronic device displays a watch, the background image may be a certain image displayed beneath other graphical elements (e.g., numbers or other symbols indicating time). Although the screen is changed, the background image may be unchanged.

According to an embodiment of the present disclosure, the AP 410 may transmit a partial image to the DDI 420 through the display interface 440. The partial image may be one of components that constitute a screen displayed by the electronic device. In an embodiment of the present disclosure, the partial image may be changed according as the screen is changed. For example, when the electronic device displays a watch, the partial image may be an image corresponding to the time indicator. This image may be changed according to the current time. For this, whenever the screen is changed, the AP 410 may transmit the partial image to the DDI 420.

In an embodiment of the present disclosure, the MCU 430 is a processor for processing a secondary function. The MCU 430 may transmit the partial image to the DDI 420 through the peripheral interface 450. The partial image may be an image displayed at a partial region requiring a change in the entire screen when a request for displaying the screen occurs. For example, when the electronic device displays a watch, the partial image may be a numeral image for forming the watch. Namely, the watch may be formed of a numeral image indicating time and a background image except numbers. In this case, the background image may be not changed. According to an embodiment of the present disclosure, the numeral image may be changed according to time, while being displayed (e.g., overlay) together with the background image. Therefore, when a request for a screen display occurs, the partial image may be changed depending on changes in the screen (e.g., according to time). For this, the MCU 430 may transmit the partial image (e.g., the numeral image) only, among the screen displayed in the panel interface 460, to the DDI 420.

In an embodiment of the present disclosure, the screen display request may occur in response to an external input through the input/output interface 150 (e.g., when a user presses a home button to turn on the screen) or in response to a wakeup signal from the communication interface 170 in a sleep mode.

In an embodiment of the present disclosure, the MCU 430 is different from the AP 410. When a request for a screen display occurs, the MCU 430 may control the display by transmitting the partial image only to the DDI 420 to reduce power consumption.

In an embodiment of the present disclosure, the MCU 430 may transmit the background image and the partial image to the DDI 420 through the peripheral interface 450.

In an embodiment of the present disclosure, the DDI 420 may maintain a state of storing the received background image or partial image. When the screen display request is received from the AP 410, the DDI 420 may synthesize and display the background image and the partial image. The AP 410 may receive the screen display request when an external input occurs through the input/output interface 150 (e.g., when a user presses a home button to turn on the screen) or when a wakeup signal occurs from the communication interface 170 in a sleep mode. For example, the background image may be a background image of a watch screen, a background image of a home screen, a background image of a menu screen, or a background image of any application screen. Namely, the background image may include various types of images. For example, the partial image may be numbers of a watch screen, a widget of a home screen, an icon of a menu screen, or the like.

In an embodiment of the present disclosure, the DDI 420 may store the received background image. In an embodiment of the present disclosure, when the screen display request is received, the DDI 420 may receive the partial image from the AP 410 or the MCU 430 and then synthesize and display the stored background image and the received partial image.

In an embodiment of the present disclosure, the DDI 420 may be configured to include therein a graphic RAM (GRAM) 421, a controller 423, and a synthesizing module 425. The GRAM 421 may be a memory used for reading or writing information required for performing a function requested by the electronic device. For example, the GRAM 421 may store information so that the DDI 420 can read and write the background image or the partial image. For example, the controller 423 may control the background image or the partial image to be processed when the background image or the partial image is received at the DDI 420. For example, the controller 423 may control the synthesizing module 425 to synthesize the background image and the partial image when both images are received from the AP 410. Namely, under the control of the controller 423, the synthesizing module 425 may synthesize the background image and the partial image. In an embodiment of the present disclosure, the controller 423 may transmit, to the panel interface 460, a final image in which the background image and the partial image are synthesized.

FIGS. 5A to 5D are block diagrams of a processor for controlling a display according to various embodiments of the present disclosure.

According to various embodiments of the present disclosure, the electronic device 101 may synthesize the background image, i.e., a static region of the screen, and the partial image, i.e., a dynamic region of the screen, and then display the synthesized final image when a request for displaying the screen on the display 160 is received from the input/output interface 150 or the communication interface 170. In various embodiments of the present disclosure, the screen displayed on the display 160 may be formed of the background image and the partial image. The background image may be static (e.g., a lock screen image). On the contrary, the partial image may be dynamic. For example, the partial image may be a refresh image that varies according to time. In various embodiments of the present disclosure, the background image and the partial image may be stored in the first and second processors, respectively. The MCU 503 may be a processor designed to perform a main function of the electronic device. For example, the main function may operate only essential elements required for displaying the screen rather than operate all elements of the electronic device. Therefore, the MCU 503 may operate more efficiently with lower power than any processor that performs all functions of the electronic device.

Now, various embodiments of the present disclosure shown in FIGS. 5A to 5D will be described, depending on when and where the partial image is received.

Figure 5A:
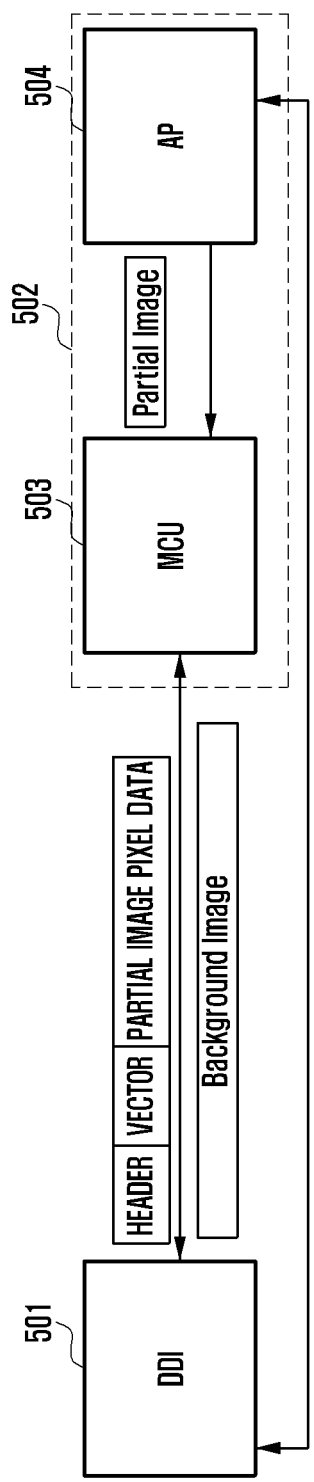
FIGS. 5A to 5D are block diagrams of a processor for controlling a display according to various embodiments of the present disclosure.
Figure 5B:
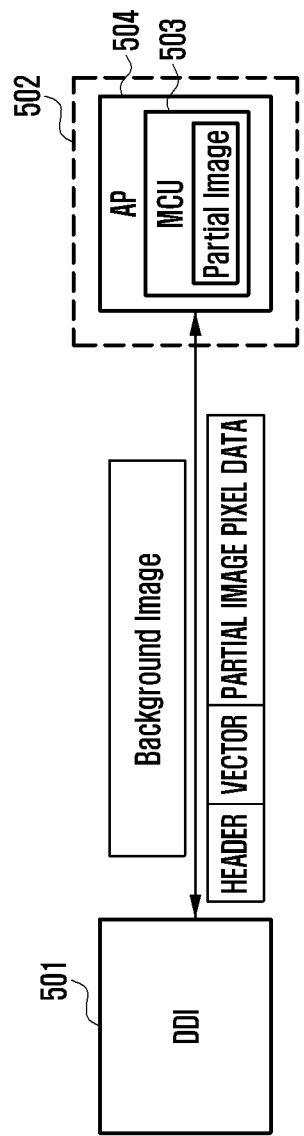
Figure 5C:
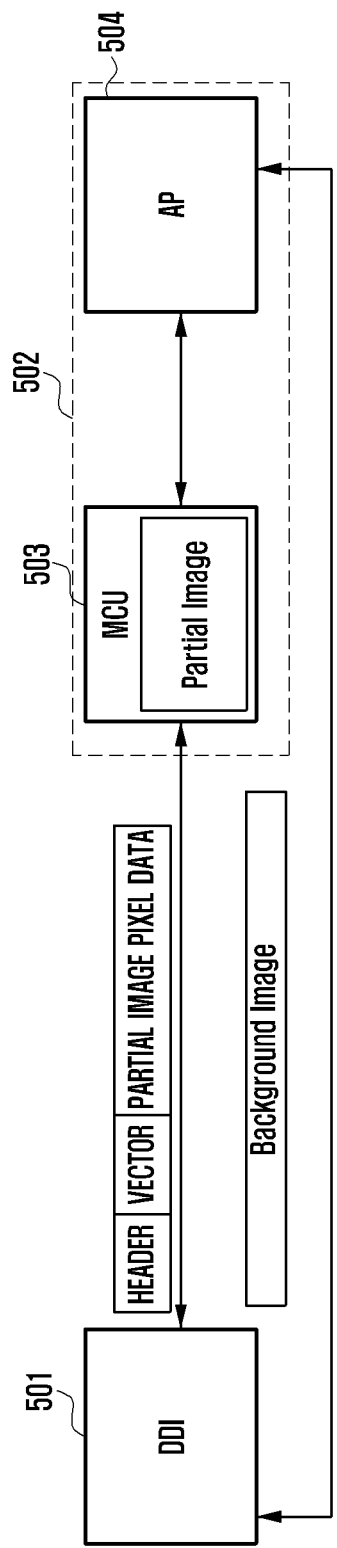

According to various embodiments of the present disclosure, FIGS. 5A and 5C illustrate examples of forming the MCU 503 and the AP 504 separately. Namely, the MCU 503 and the AP 504 may be formed independently in the image processor 502 so as to perform a function individually.

Figure 5D:
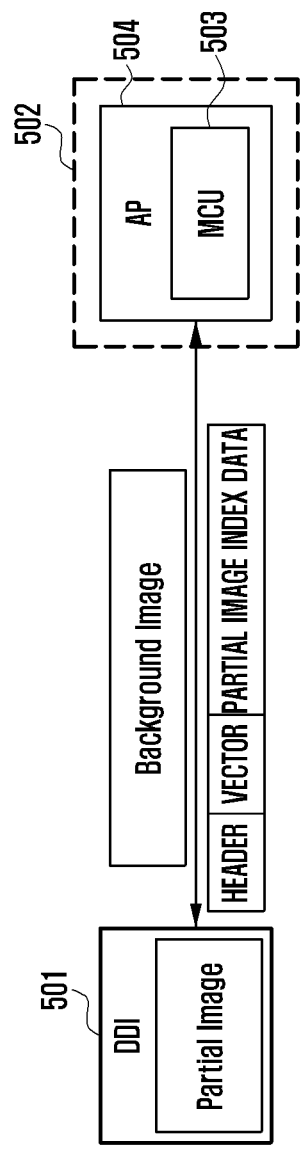

According to various embodiments of the present disclosure, FIGS. 5B and 5D illustrate examples of forming the MCU 503 and the AP 504 en bloc. In an embodiment of the present disclosure, the AP 504 may include therein the MCU 503 in the form of a chip.

Referring to FIG. 5A, the image processor 502 may be configured to include the MCU 503 and the AP 504. The image processor 502 may be woken up periodically or in response to a screen display request (i.e., a request for activating the display 160) from the communication interface 170 or the input/output interface 150. According to an embodiment of the present disclosure, the DDI 501 may store the background image. The background image may be stored in advance or after being received from the image processor 502. When the screen display request is received from the input/output interface 150 or the communication interface 170, the image processor 502 may transmit the partial image to the DDI 501.

In an embodiment of the present disclosure, the partial image may be data transmitted to the MCU 503 by the AP 504 when the AP 504 enters a sleep mode. When the screen display request is received, the MCU 503 may transmit the partial image, received from the AP 504, to the DDI 501.

In an embodiment of the present disclosure, the partial image may be data transmitted to the MCU 503 by an external electronic device (e.g., the server 106). When the screen display request is received, the MCU 503 may transmit the partial image, received from the external device (e.g., the server 106), to the DDI 501. The DDI 501 may display the final image in which the stored background image and the partial image received from the MCU 503 are synthesized.

As discussed above, when any display request is received from the input/output interface 150 or the communication interface 170, the image processor 502 may transmit only the partial image to the DDI 501. While storing the background image, the DDI 501 may receive the partial image from the image processor 502. Also, the DDI 501 may display the final image in which the stored background image and the received partial image are synthesized. Therefore, the DDI 501 may control a display operation of the display 160 with lower power as compared to transmitting the entire image.

Referring to FIG. 5B, in an embodiment of the present disclosure, the image processor 502 may be formed in the MCU 503 and the AP 504. The MCU 503 may be contained in the AP 504 and store the partial image therein. When any display request is received from the input/output interface 150 or the communication interface 170, the MCU 503 may transmit the stored partial image to the DDI 501. Since the operation of the DDI 501 is the same as discussed above in FIG. 5A, the description thereof will be omitted herein.

Referring to FIG. 5C, in an embodiment of the present disclosure, the image processor 502 may be formed by the MCU 503 and the AP 504. The MCU 503 may store the partial image therein. When the AP 504 enters a sleep mode, the MCU 503 may perform the function of the AP 504. If any screen display request is received while the AP 504 is in a sleep mode, the MCU 503 may transmit the stored partial image to the DDI 501. The MCU 503 may receive such a screen display request from the input/output interface 150 or the communication interface 170. Since the operation of the DDI 501 is the same as discussed above in FIG. 5A, the description thereof will be omitted herein.

Referring to FIG. 5D, in an embodiment of the present disclosure, the image processor 502 may be formed in the MCU 503 and the AP 504. The MCU 503 may be contained in the AP 504. The image processor 502 may transmit the background image to the DDI 501. The DDI 501 may store the partial image together with the received background image. In an embodiment of the present disclosure, when the screen display request is received from the image processor 502, the DDI 501 may display the final image in which the stored background image and the received partial image are synthesized.

In the-above discussed embodiments of the present disclosure, information about the partial image may include header information, vector information, partial image pixel data information, partial image index data information, and/or the like. The header information may contain specific data defined to indicate the content or features of the partial image. The vector information may include a vector value of the partial image to be displayed by the image processor 502. For example, if the image processor 502 displays a watch, the image processor 502 may have vector values of numbers (i.e., from zero to nine) forming the watch in the entire screen region. The partial image pixel data information may include pixel values of the partial image. The partial image index information may be an index or list of arranging a plurality of partial images. The partial image index information may include names, sizes, attributes, storing locations, etc. of partial images. When a request for driving the display 160 occurs, the partial image index information may be used as references for retrieving the partial images. In an embodiment of the present disclosure, the partial image index information may be transmitted to the DDI 501 when the partial image pixel data information is stored in the DDI 501.

In an embodiment of the present disclosure, the image processor 502 may synthesize the partial image with the background image. In an embodiment of the present disclosure, the image processor 502 may store the partial image information in a storage space thereof. Therefore, when any display request is received in a sleep mode or a lock screen, the image processor 502 may transmit the partial image only and thereby control the display with lower power than transmitting the entire image having the background image.

According to an embodiment of the present disclosure, the image processor 502 may process a directly received user input. For this, the image processor 502 may store the background images corresponding to various cases. In case of displaying a lock screen, the image processor 502 may store, as the background image, a specific image for the lock screen. When displaying a watch screen, the image processor 502 may store, as the background image, a specific image to be displayed with numbers of a watch. In case of displaying a music play screen, the image processor 502 may store a specific image defined as the background image. When the background image is stored, the image processor 502 may newly display the partial image only. For example, the electronic device having a small-sized display panel such as a smart watch may store the background image to be displayed on the display. This background image may be an image except numbers of the smart watch. When any display request is received from the input/output interface or the communication interface, the image processor 502 may refresh only the partial image corresponding to the present time. The image processor 502 may display the final image in which the stored background image and the refreshed partial image.

In an embodiment of the present disclosure, to display a time, a message reception screen, a call reception screen, or the like, the image processor 502 may store background images corresponding to respective screens.

In an embodiment of the present disclosure, the image processor 502 may store various information, such as icons, fonts, etc., for partial images associated with time information, date information, battery information, received message information, received call information, or the like in the memory 130 in the form of index. In an embodiment of the present disclosure, when any screen display request occurs, the image processor 502 may process the partial image with reference to such stored information.

In an embodiment of the present disclosure, the image processor 502 may transmit the partial image to the DDI 501 through the display interface (e.g., MIPI) or the peripheral interface. The DDI 501 may be configured to have an internal storage space (e.g., RAM, ROM, or registers). Therefore, the DDI 501 may store, in the form of index, the partial image received from the image processor 502. The image processor 502 may process the partial image stored in the storage space of the DDI 501.

Figure 6:
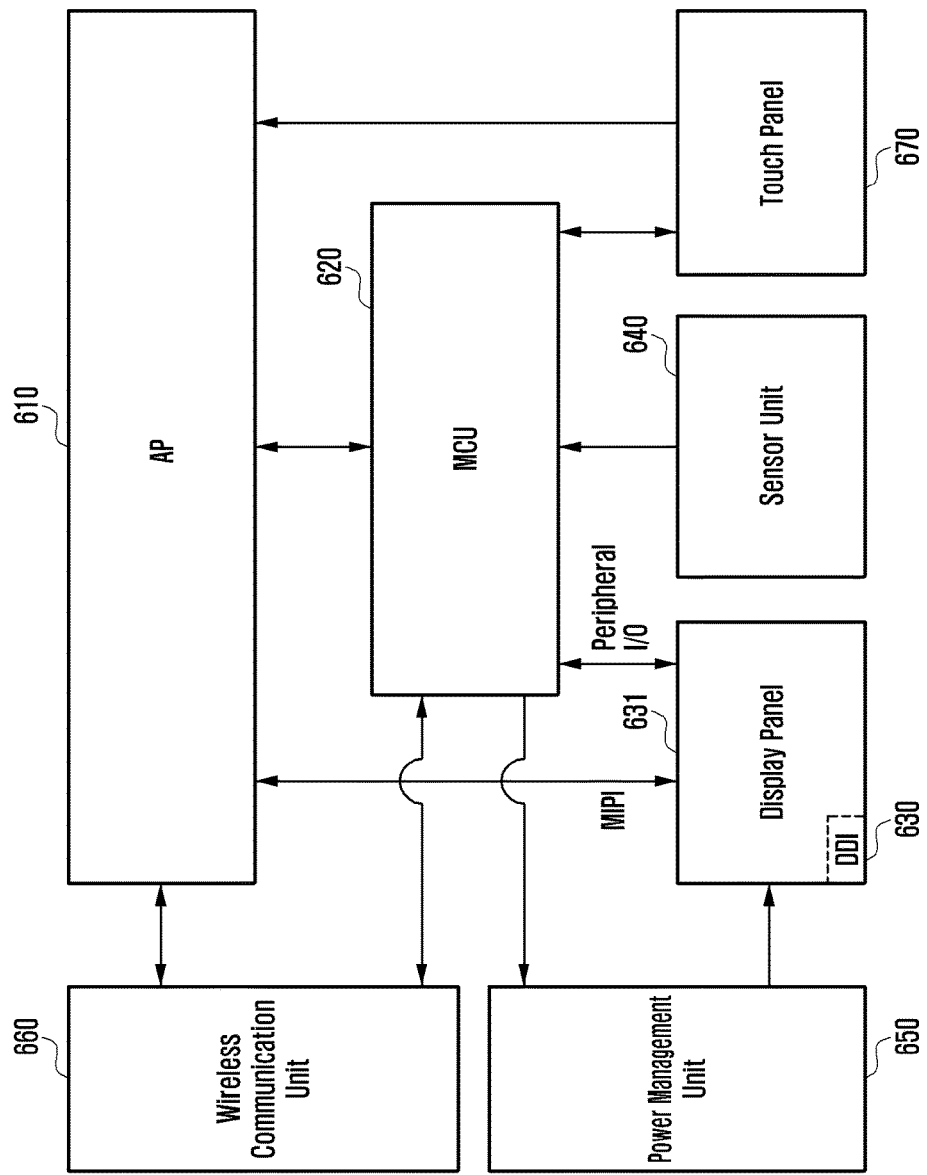
FIG. 6 is a block diagram of an electronic device according to various embodiments of the present disclosure.

FIG. 6 is a block diagram of an electronic device according to various embodiments of the present disclosure.

Referring to FIG. 6, the electronic device according to various embodiments may be configured to include an AP 610, an MCU 620, a display panel 631, a sensor unit 640, a power management unit 650, a wireless communication unit 660, and a touch panel 670. These elements of the electronic device are not to be considered as a limitation.

In an embodiment of the present disclosure, the electronic device may include an AP 610, a MCU 620, a DDI 630, a display panel 631, a sensor unit 640, a power management unit 650, and a wireless communication unit 660.

According to an embodiment of the present disclosure, the power management unit 650 may be a PMIC. In an embodiment of the present disclosure, the power management unit 650 may control the display panel 631 to be turned on or off.

In an embodiment of the present disclosure, when a user input for turning the power off occurs, the power management unit 650 may receive a signal for turning off the display panel 631. In an embodiment of the present disclosure, when a user input for turning the power off occurs, the AP 610 may receive a signal for turning off the display panel 631. For example, such a signal for turning off the display panel 631 may be generated when there is no input for a specific time in a state where power is supplied to the display panel 631. The power management unit 650 may turn off the power of the display panel 631 when a turn-off signal is received. According to an embodiment of the present disclosure, the AP 610 may transmit the partial image to the DDI 601 at the time of an entrance into a sleep mode. This time of an entrance into a sleep mode may correspond to a time point when a given time elapses without any event, when a flip cover is closed, or when a power button is pressed to turn off the power of the display panel 631. The partial image may be a certain image forming a part of the screen, for example, letters, numbers, symbols, icons, or any other equivalent.

According to an embodiment of the present disclosure, when the screen display request is received, the MCU 620 may transmit the partial image, received from the AP 610, to the DDI 630. The MCU 620 may receive a signal of the screen display request through the wireless communication unit 660 or the sensor unit 640 while the power of the display panel 631 is turned off. For example, in case of receiving a text message, the screen display request signal may be received through the wireless communication unit 660. In another example, when variations of illumination, velocity, temperature, etc. are detected through the sensor unit 640, the MCU 620 may receive the screen display request signal from the sensor unit 640.

According to an embodiment of the present disclosure, when any screen display request is received, the MCU 620 may transmit, to the DDI 630, the partial image received from an external electronic device (e.g., the server 106 in FIG. 1). The MCU 620 may receive such a screen display request through the wireless communication unit 660 or the sensor unit 640 while the power of the display panel 631 is turned off. For example, in case of receiving a text message, the screen display request signal may be received through the wireless communication unit 660. In another example, when variations of illumination, velocity, temperature, etc. are detected through the sensor unit 640, the MCU 620 may receive the screen display request signal from the sensor unit 640. According to an embodiment of the present disclosure, the DDI 630 may store the background image, which may be received from the AP 610 or the MCU 620 or stored in advance in the DDI 630. The DDI 630 may store, in the form of index, the partial image received from the MCU 620 in GRAM. Also, to support various types of languages, the DDI 630 may store, in the form of index, font information, icon information, and/or the like. Additionally, through the synthesizing module equipped therein, the DDI 630 may synthesize the background image and the partial image. Then the DDI 630 may display the synthesized final image on the display panel 631.

The electronic device according to an embodiment of the present disclosure may include the AP 610, the DDI 630, the display panel 631, the power management unit 650, and the wireless communication unit 660.

According to an embodiment of the present disclosure, the AP 610 may transmit the background image to the DDI 630. When storing the partial image information, the AP 610 may enter a sleep mode. For example, the time of an entrance into a sleep mode may correspond to a time point when a given time elapses without any event, when a flip cover is closed, or when a power button is pressed to turn off the power of the display panel 631.

In an embodiment of the present disclosure, the AP 610 may receive a signal of display request from the wireless communication unit 660. For example, this signal may be generated when push data, a text message, an incoming call, or the like is received from the wireless communication unit 660. In another example, this signal may be generated at the touch panel 670 or by any event made on the touch panel 670 with power supplied.

When any display request is received, the AP 610 may send a corresponding partial image to the DDI 630.

According to an embodiment of the present disclosure, the DDI 630 may store the background image. In an embodiment of the present disclosure, the DDI 630 may store the background image from the outset. In an embodiment of the present disclosure, when the AP 610 receives a screen display request, the DDI 630 may temporarily store the background image received from the AP 610 or the MCU 620. According as the AP 610 receives such a screen display request, the DDI 630 may receive the partial image from the AP 610. Then the DDI 630 may synthesize the stored background image and the received partial image. In an embodiment of the present disclosure, the DDI 630 may control the display panel 631 to display the synthesized final image.

According to an embodiment of the present disclosure, the electronic device may include the AP 610, the MCU 620, the DDI 630, the display panel 631, the sensor unit 640, the power management unit 650, the wireless communication unit 660, and the touch panel 670.

In an embodiment of the present disclosure, the AP 610 may transmit the background image to the DDI 630. The AP 610 may recognize that the electronic device enters a sleep mode. For example, the time of an entrance into a sleep mode may correspond to a time point when a given time elapses without any event, when a flip cover is closed, or when a power button is pressed to turn off the power of the display panel 631.

In an embodiment of the present disclosure, the power management unit 650 may turn off the display panel 631 in a sleep mode. Also, the power management unit 650 may enter a low-power mode.

In an embodiment of the present disclosure, the MCU 620 may store the partial image. When the AP 610 is in a sleep mode, the MCU 620 may perform some functions of the AP 610. The MCU 620 may receive a display request such as a push alarm received from the wireless communication unit 660. Then the MCU 620 may transmit the partial image to the DDI 630.

In an embodiment of the present disclosure, in case of incapable of the function of the AP 610, the MCU 620 may transmit a wakeup signal for activating the AP 610 to the AP 610. For example, when a request for executing the camera occurs, the MCU 620 may determine to display an image on the entire region of the display panel 621. Namely, the MCU 620 may recognize that a new image cannot be displayed on the entire region, and thereby transmit the wakeup signal to the AP 610. Then the AP 610 may be activated and execute the camera.

The DDI 630 may store the background image, which may be received from the AP 610 or the MCU 620 or stored in advance therein. The DDI 630 may synthesize the stored background image and the partial image through alpha blending technique or rendering technique, for example. Then the DDI 630 may control a display of the synthesized final image.

Figure 7A:
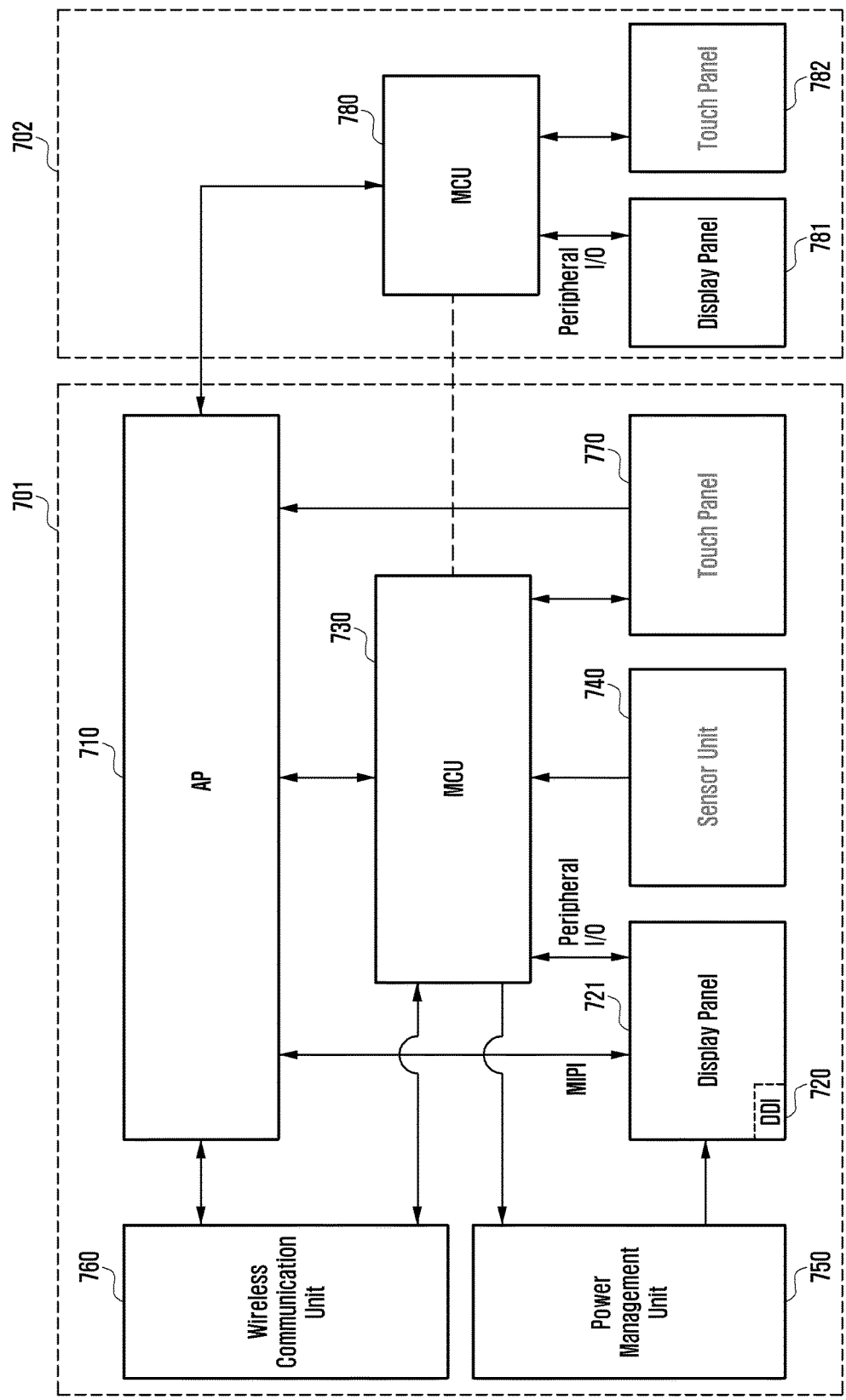
FIGS. 7A and 7B are block diagrams of an electronic device according to various embodiments of the present disclosure.
Figure 7B:
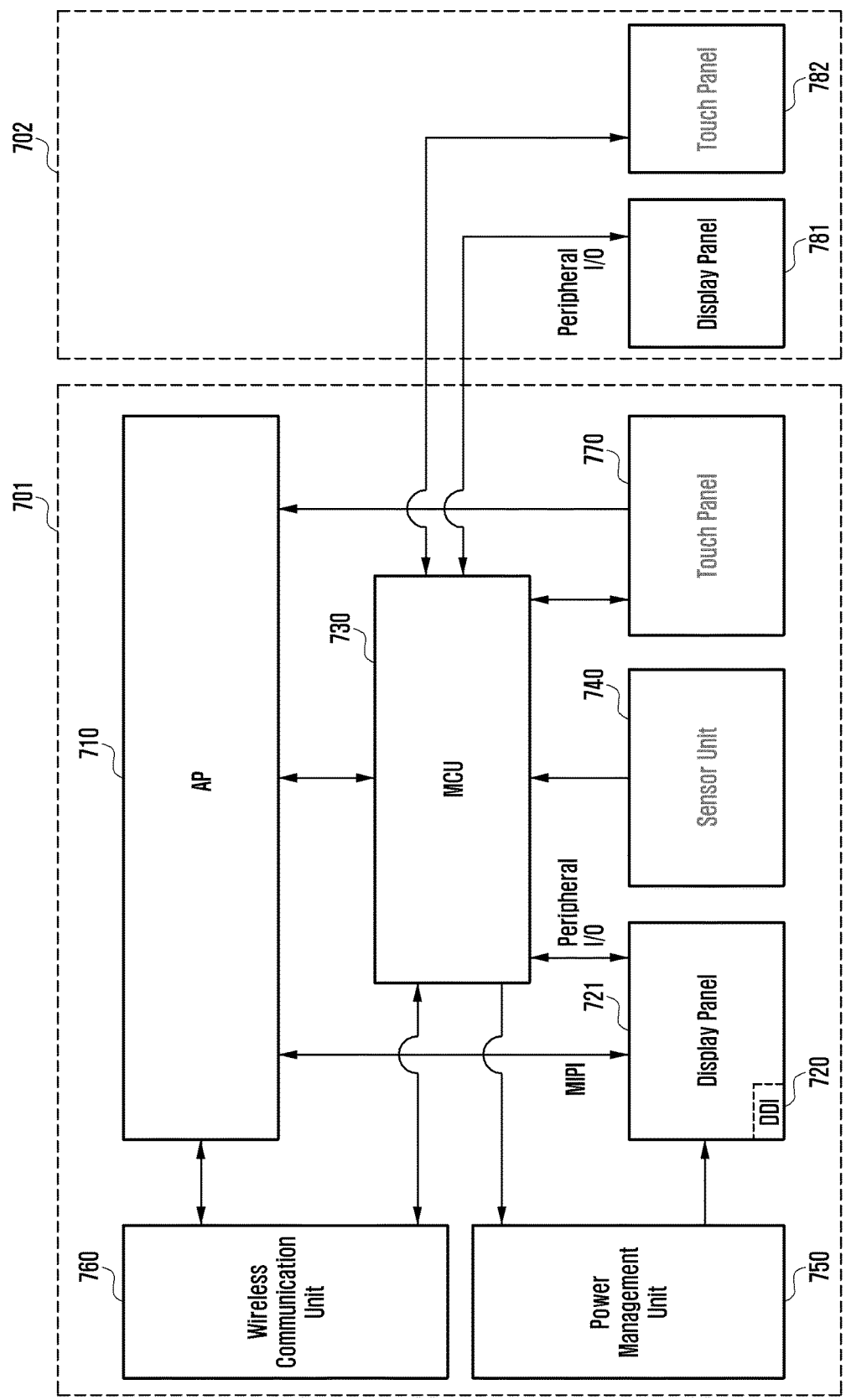

FIGS. 7A and 7B are block diagrams of an electronic device according to various embodiments of the present disclosure.

Referring to FIGS. 7A and 7B, in an embodiment of the present disclosure, an electronic device 701 may be connected with an external electronic device 702. The electronic device 701 may include an AP 710, a DDI 720, a display panel 721, an MCU 730, a sensor unit 740, a power management unit 750, a wireless communication unit 760, and a touch panel 770. The external electronic device 702 may be a device having a display that acts as an additional display of the electronic device 701. For example, the external electronic device 702 may be a wearable device (such as smart glasses, HMD, electronic bracelet, electronic necklace, electronic accessories, smart mirror, smart watch, etc.), cover display, and the like. The electronic device 701 may be equivalent to the above-discussed electronic device 101 in FIG. 1, so that the description thereof will be omitted. In an embodiment of the present disclosure, when the electronic device 701 has a plurality of displays, the external electronic device 702 may be one of the displays.

Referring to FIG. 7A, the external electronic device 702 may include MCU 780, a display panel 781, and a touch panel 782. The MCU 780 of the external electronic device 702 may be connected with the AP 710 of the electronic device 701. An MCU 730 of the electronic device 701 may control the external electronic device 702 through the MCU 780 of the external electronic device 702.

In an embodiment of the present disclosure, when receiving a partial image from the MCU 730, the MCU 780 of the external electronic device 702 may control the display panel 781 to display the received partial image.

In an embodiment of the present disclosure, when receiving a display request from the MCU 730 while storing the partial image, the MCU 780 of the external electronic device 702 may control the display panel 781 to display the stored partial image.

The MCU 780 of the external electronic device 702 may receive the partial image from the AP 710.

In an embodiment of the present disclosure, when the partial image is received from the AP 710, the MCU 780 of the external electronic device 702 may control the display panel 781 to display the received partial image.

In an embodiment of the present disclosure, when a display request is received from the AP 710 in a state of storing the partial image, the MCU 780 of the external electronic device 702 may control the display panel 781 to display the stored partial image.

In an embodiment of the present disclosure, the MCU 780 may store the received partial image as well as the previously stored partial image.

In an embodiment of the present disclosure, the MCU 780 may receive the partial image from another external electronic device (e.g., the server 106 in FIG. 1) and store the received partial image.

Referring to FIG. 7B, the MCU 730 may be connected with the external electronic device 702 that includes the display panel 781 and the touch panel 782, while omitting an MCU. In this case, the MCU 730 may process an input occurring at the external electronic device 702. For example, if the display panel 781 displays a watch and if the touch panel 782 receives an input for changing a displayed time, the MCU 730 may control the display panel 781 of the external electronic device 702 to display the changed time.

In an embodiment of the present disclosure, the MCU 730 may transmit a wakeup signal for triggering the AP 710 to the AP 710. The AP 710 may process an input generated at the external electronic device 702. For example, the MCU 730 may send a wakeup signal to the AP so as to drive the camera. The AP 710 receiving the wakeup signal may drive the camera.

FIGS. 8A to 8G are flow diagrams of methods for controlling a display of an electronic device according to various embodiments of the present disclosure.

Referring to FIGS. 8A to 8G, displayed screens may be formed by a background image and a partial image. The background image may be one of components that constitute the screen. Although the screen is changed, the background image may be static. The partial image may be one of components that constitute the screen. The partial image may be changed according as the screen is changed. For example, in a watch screen, the background image may be an image except numbers of the watch screen, and the partial image may be a numeral image of the watch screen.

In an embodiment of the present disclosure, each of the background image and the partial image may be a compressed image, a raw image, a processed image, or the like.

Figure 8A:
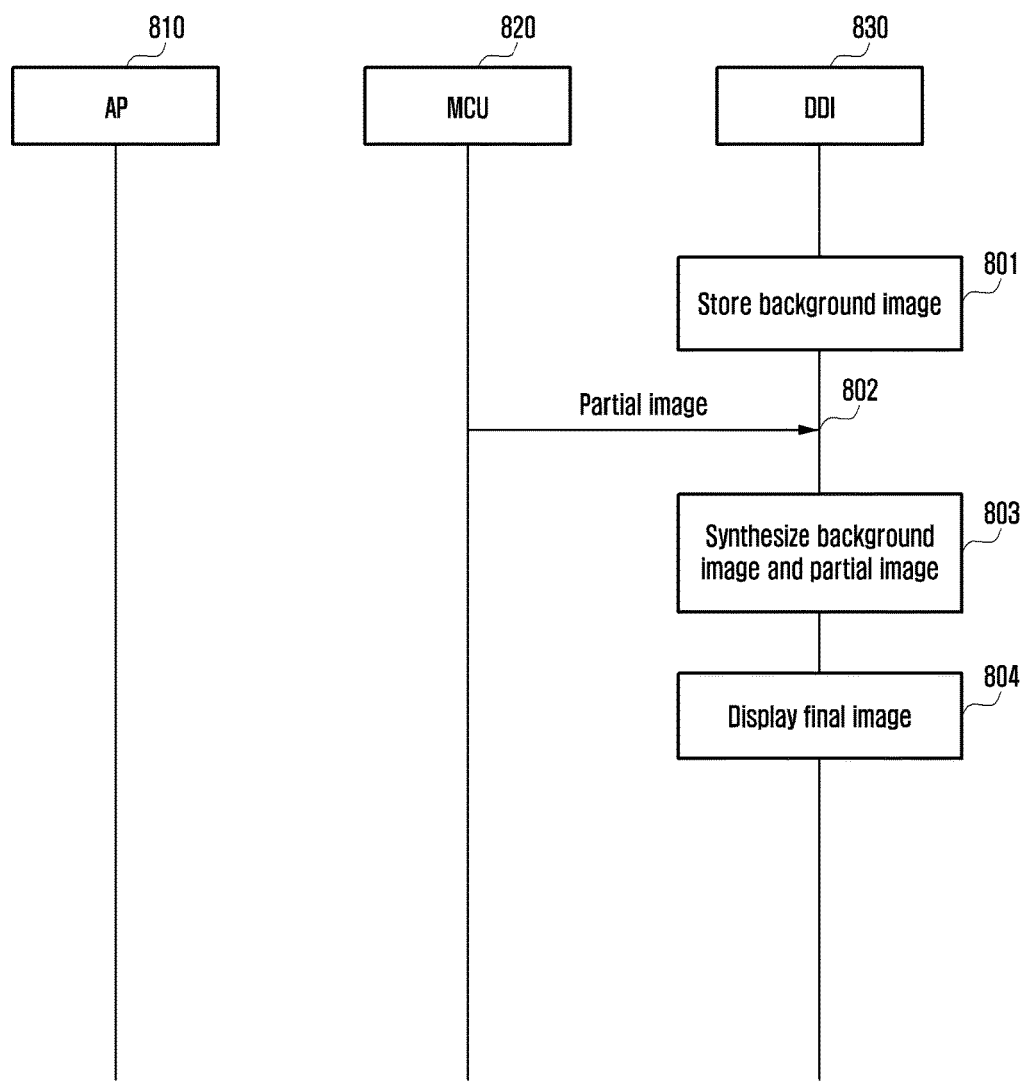
FIGS. 8A to 8G are flow diagrams of methods for controlling a display of an electronic device according to various embodiments of the present disclosure.

Referring to FIG. 8A, the electronic device may display the screen using the AP 810, the MCU 820 and the DDI 830. The AP 810 and the MCU 820 may be separate elements, or the MCU 820 may be embedded in the AP 810. Hereinafter, the operation of the MCU 820 may be a part of the operation of the AP 810.

In an embodiment of the present disclosure, the DDI 830 may store the background image at operation 801. The DDI 830 may temporarily store the background image, which may be received from the AP 810, received from the MCU 820, or stored in advance therein.

In an embodiment of the present disclosure, when a display request signal is received from the AP 810, the MCU 820 may transmit the partial image to the DDI 830 at operation 802. In an embodiment of the present disclosure, the partial image transmitted to the DDI 830 may be stored in advance in the MCU 820. In an embodiment of the present disclosure, the partial image transmitted to the DDI 830 may be received from any external electronic device (e.g., the server 106 in FIG. 1). At operation 803, the DDI 830 may synthesize the background image and the partial image. For example, this synthesis may use rendering technique, alpha blending technique, or the like. The rendering technique may create a three-dimensional image by adding a two-dimensional image based on external information such as a light source, a location, a color, and the like. The alpha blending technique may create a new image by adjusting transparency. At operation 804, the DDI 830 may display the final image obtained by the synthesizing operation.

Figure 8B:
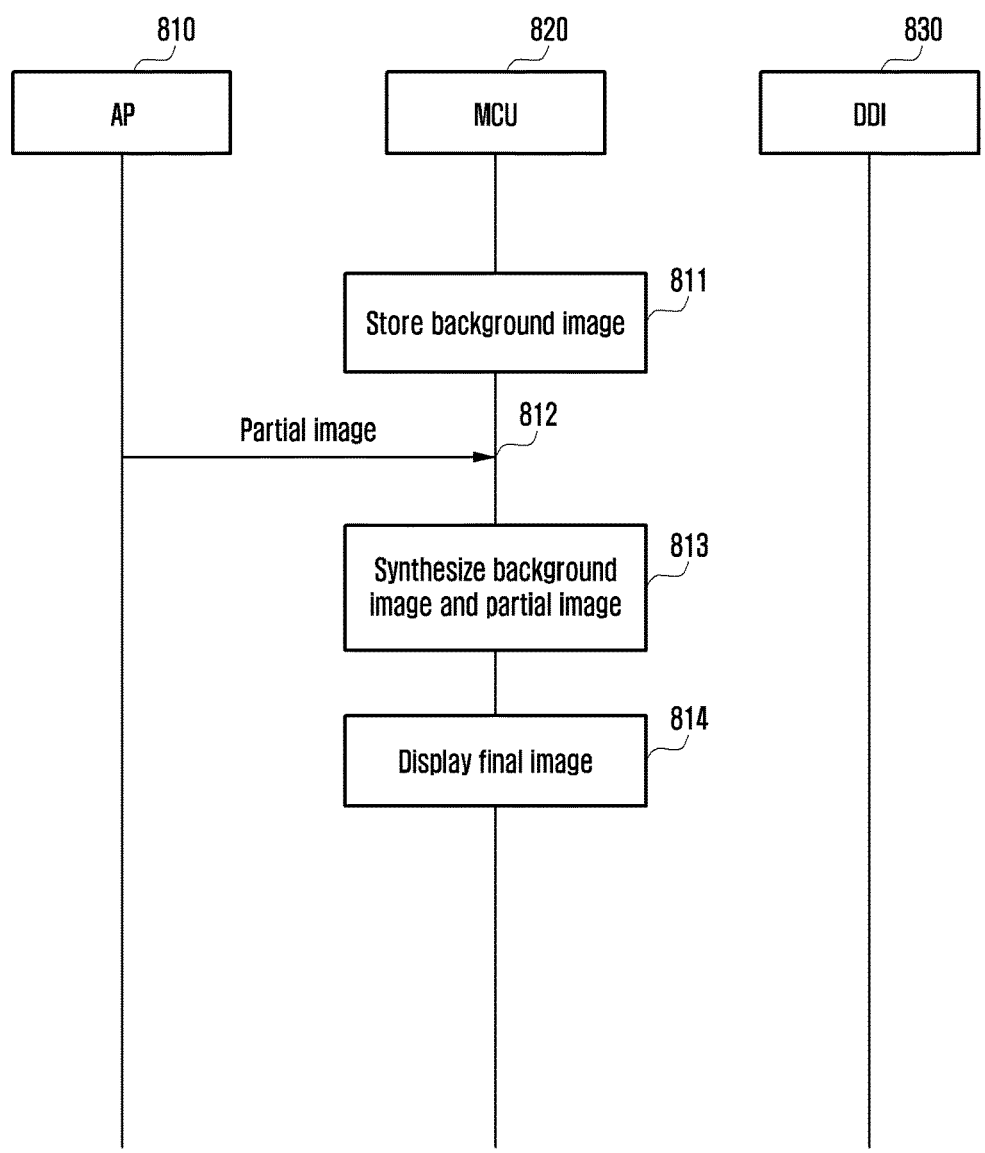

Referring to FIG. 8B, the MCU 820 may store the background image at operation 811. In an embodiment of the present disclosure, the MCU 820 may temporarily store the background image, which may be received from the AP 810, received from the DDI 830, or stored in advance therein. In an embodiment of the present disclosure, when a display request signal is received, the AP 810 may transmit the partial image to the MCU 820 at operation 812. For example, when entering a sleep mode, the AP 810 may transmit the stored partial image to the MCU 820. The time of an entrance into a sleep mode may correspond to a time point when a given time elapses without any event, when a flip cover is closed, or when a power button is pressed to turn off the power of the display panel 631. The partial image transmitted by the AP 810 may be stored in advance in the AP 810. At operation 813, the MCU 820 may synthesize the background image and the partial image. For example, this synthesis may use a rendering technique, an alpha blending technique, or the like. At operation 814, the MCU 820 may display the final image obtained by the synthesizing operation.

Figure 8C:
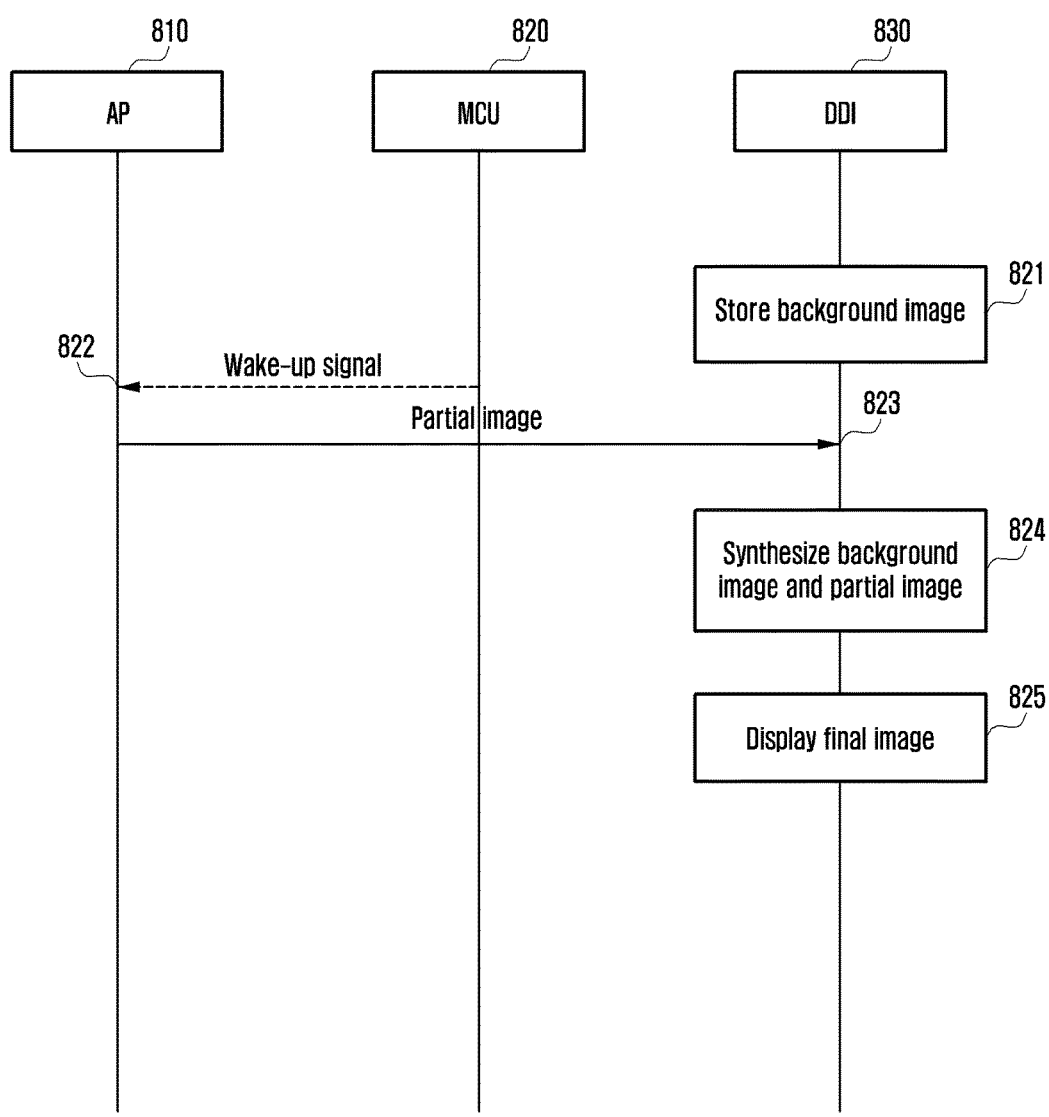

Referring to FIG. 8C, the DDI 830 may store the background image at operation 821. In an embodiment of the present disclosure, the DDI 830 may temporarily store the background image, which may be received from the AP 810 or the MCU 820 or stored in advance therein. In an embodiment of the present disclosure, when a display request signal (e.g., a wakeup signal) is received from the MCU 820 at operation 822, the AP 810 may transmit the partial image to the DDI 830 at operation 823. When entering a sleep mode, the AP 810 may transmit the stored partial image to the DDI 830. For example, the time of an entrance into a sleep mode may correspond to a time point when a given time elapses without any event, when a flip cover is closed, or when a power button is pressed to turn off the power of the display panel 631. The partial image transmitted by the AP 810 may be stored in advance in the AP 810. At operation 824, the DDI 830 may synthesize the background image and the partial image. For example, this synthesis may use rendering technique, alpha blending technique, or the like. At operation 825, the DDI 830 may display the final image obtained by the synthesizing operation.

Figure 8D:
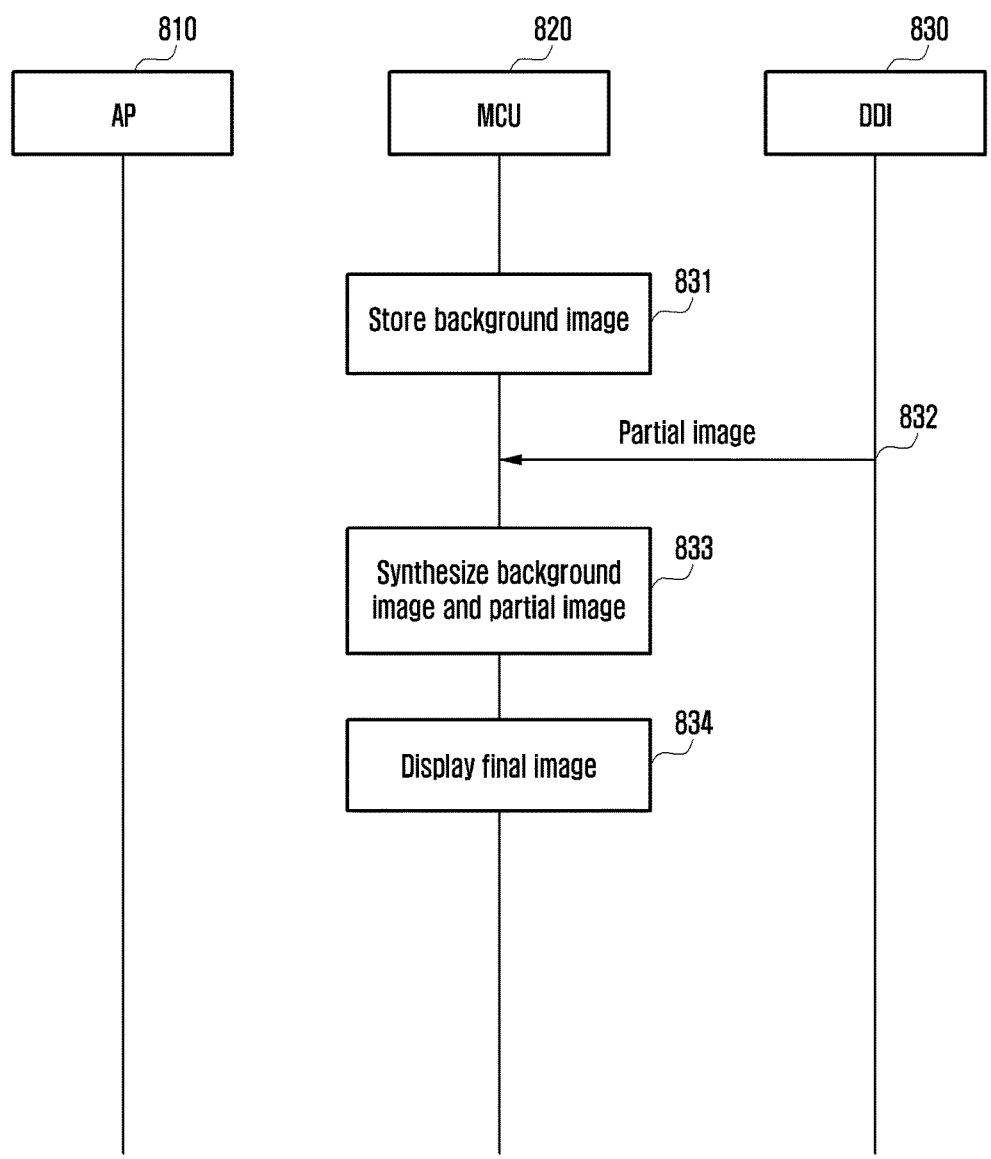

Referring to FIG. 8D, the MCU 820 may store the background image at operation 831. In an embodiment of the present disclosure, the MCU 820 may temporarily store the background image, which may be received from the AP 810 or the DDI 830 or stored in advance therein. In an embodiment of the present disclosure, when a display request signal is received from the AP 810, the DDI 830 may transmit the partial image to the MCU 820 at operation 832. The partial image transmitted by the DDI 830 may be stored in advance in the DDI 830. At operation 833, the MCU 820 may synthesize the background image and the partial image. For example, this synthesis may use rendering technique, alpha blending technique, or the like. At operation 834, the MCU 820 may display the final image obtained by the synthesizing operation.

Figure 8E:
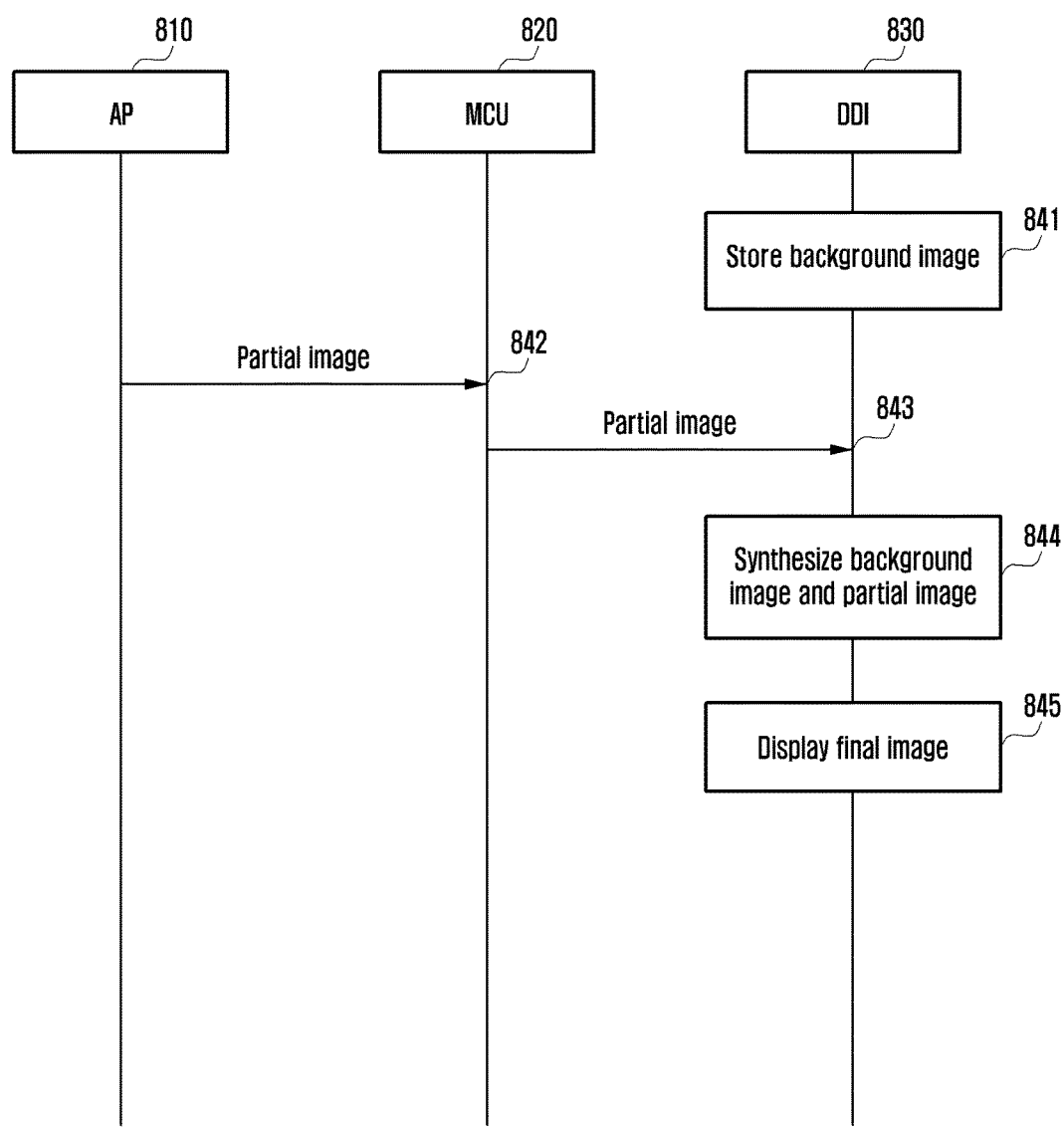

Referring to FIG. 8E, the DDI 830 may store the background image at operation 841. In an embodiment of the present disclosure, the DDI 830 may temporarily store the background image, which may be received from the AP 810 or the MCU 820 or stored in advance therein. In an embodiment of the present disclosure, when entering a sleep mode, the AP 810 may transmit the partial image to the MCU 820 at operation 842. For example, the time of an entrance into a sleep mode may correspond to a time point when a given time elapses without any event, when a flip cover is closed, or when a power button is pressed to turn off the power of the display panel 631. When a display request signal is received from the AP 810, the MCU 820 may transmit the partial image to the DDI 830 at operation 843. At operation 844, the DDI 830 may synthesize the background image and the partial image. For example, this synthesis may use rendering technique, alpha blending technique, or the like. At operation 845, the DDI 830 may display the final image obtained by the synthesizing operation.

Figure 8F:
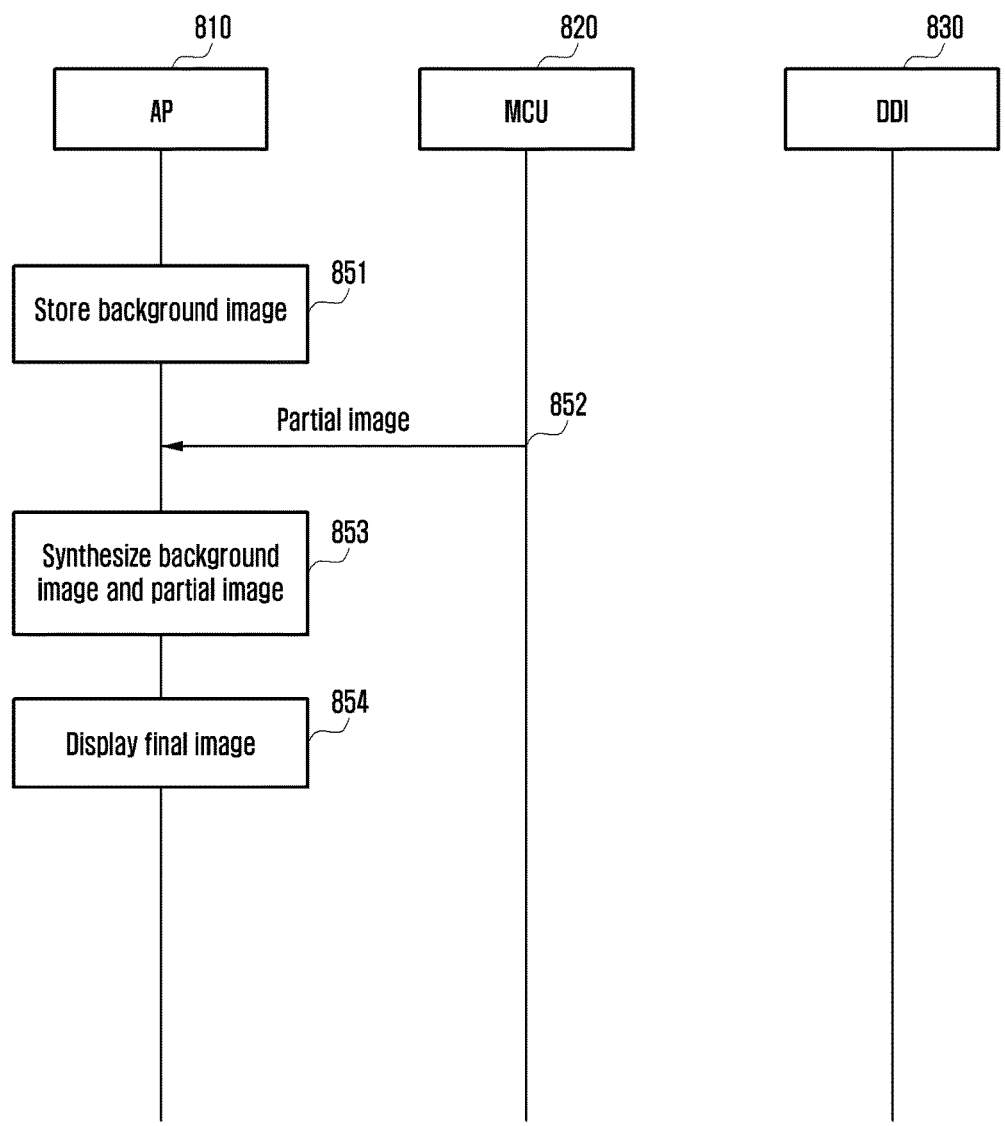

Referring to FIG. 8F, the AP 810 may store the background image at operation 851. The background image stored in the AP 810 may be received from the MCU 820 or stored in advance therein. In an embodiment of the present disclosure, when a display request signal is received from the input/output interface or the communication interface, the AP 810 may receive the partial image from the MCU 820 at operation 852. The partial image transmitted by the MCU 820 may be stored in advance in the MCU 820. At operation 853, the AP 810 may synthesize the background image and the partial image. For example, this synthesis may use rendering technique, alpha blending technique, or the like. At operation 854, the AP 810 may display the final image obtained by the synthesizing operation.

Figure 8G:
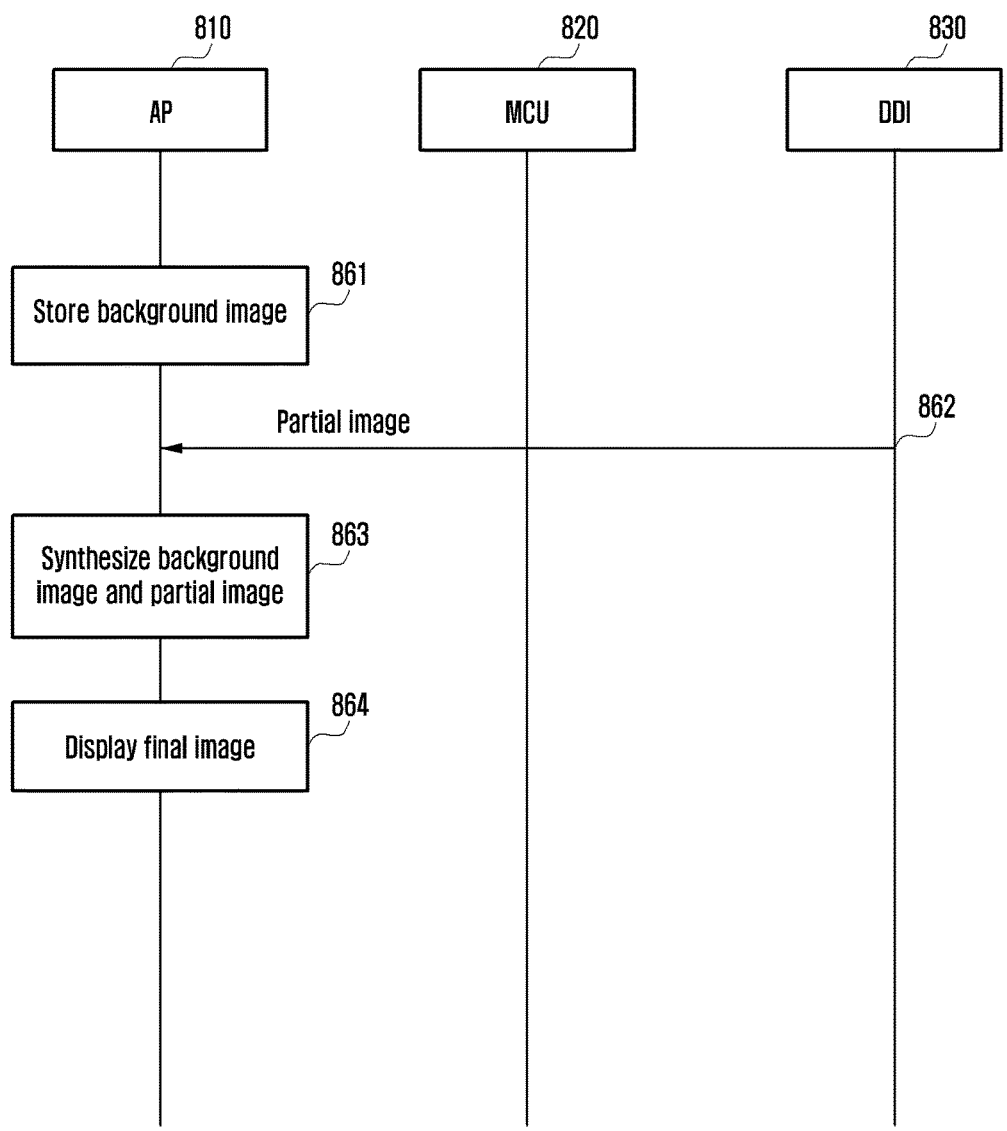

Referring to FIG. 8G, the AP 810 may store the background image at operation 861. The AP 810 may temporarily store the background image, which may be received from the MCU 820 or stored in advance therein. In an embodiment of the present disclosure, when a display request signal is received from the input/output interface or the communication interface, the AP 810 may receive the partial image from the DDI 830 at operation 862. The partial image transmitted by the DDI 830 may be stored in advance in the DDI 830. At operation 863, the AP 810 may synthesize the background image and the partial image. For example, this synthesis may use rendering technique, alpha blending technique, or the like. At operation 864, the AP 810 may display the final image obtained by the synthesizing operation.

FIGS. 9A to 9F are screenshots of methods for controlling a display of an electronic device according to various embodiments of the present disclosure.

Figure 9A:
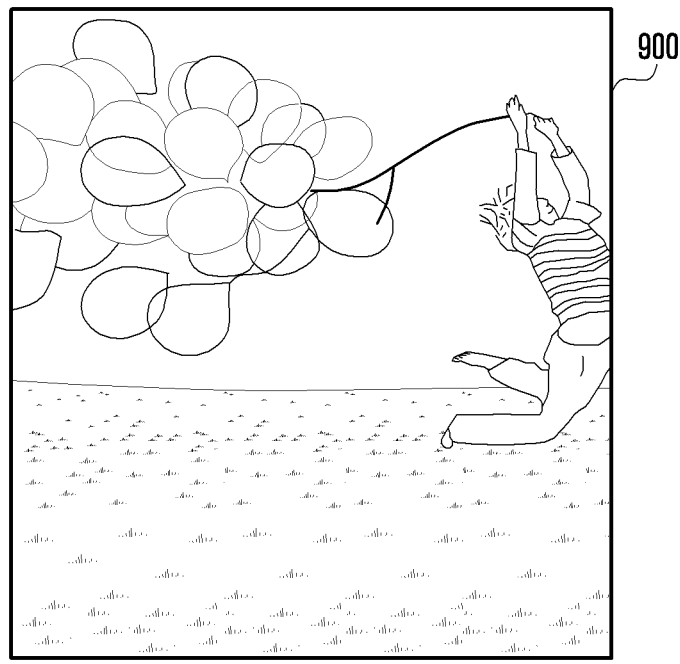

Referring to FIG. 9A, a background image 900 is illustrated. The background image 900 may be associated with user interface (UI) or user experience (UX) of the electronic device. The background image 900 may be displayed on the entire region of the display when a display request occurs. According to an embodiment of the present disclosure, the background image 900 may be stored in the first processor and transmitted to the second processor in the form of being compressed. In an embodiment of the present disclosure, the second processor may decode the background image 900.

In an embodiment of the present disclosure, the first processor is the AP, and the second processor is the MCU. In an embodiment of the present disclosure, the first processor is the MCU, and the second processor is the DDI. In an embodiment of the present disclosure, the first processor is the AP, and the second processor is the DDI. In an embodiment of the present disclosure, the first processor is the MCU, and the second processor is the AP.

Figure 9B:
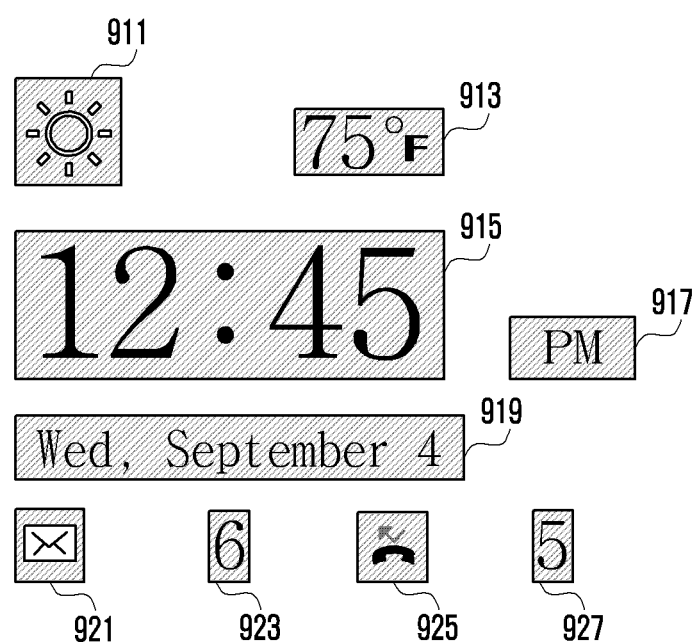

Referring to FIG. 9B example partial images are illustrated. The partial images may be displayed on a region of the display when a display request occurs. The partial image may be transmitted to the processor periodically (e.g., depending on time variations) or in response to a signal received from the input/output interface (e.g., when a user presses a home button to turn on the screen). The partial image may be the minimum display data that dynamically changes, including header information, vector information, and pixel information. The header information may contain specific data defined to indicate the content or features of the partial image. The vector information may include a vector value of the partial image to be displayed by the processor. For example, if the processor displays a watch, the watch screen may have vector values of numbers (i.e., from zero to nine) that constitute the watch. The vector information may determine a region of displaying numbers or other symbols to represent time information. The pixel information may be at least one pixel value matched to the display through one-to-ones correspondence. Also, a plurality of the partial images may be displayed at a time. For example, as shown, partial images 911, 913, 915, 917, 919, 921, 923, 925 and 927 may be implemented as icons, fonts, symbols, etc. to represent time information, date information, battery information, received message information, received call information, or the like.

Referring to FIG. 9C, a process is illustrated for synthesizing the background image and the partial image to obtain and display a final image. The first processor (e.g., DDI) of the electronic device may store the background image 900 in an internal storage space (e.g., GRAM). In an embodiment of the present disclosure, the first processor may receive the partial images 911, 913, 915, 917, 919, 921, 923, 925 and 927 from the second processor (e.g., MCU). These partial images may be received from the second processor when the second processor receives a display request from the communication interface or the input/output interface. In an embodiment of the present disclosure, the first processor may synthesize the background image 900 and the partial images 911, 913, 915, 917, 919, 921, 923, 925 and 927 as shown in screenshot 920. Thereafter, the first processor may control the display to display the final image 930 by adjusting the transparency of the partial images through the synthesizing module equipped therein.

Figure 9D:
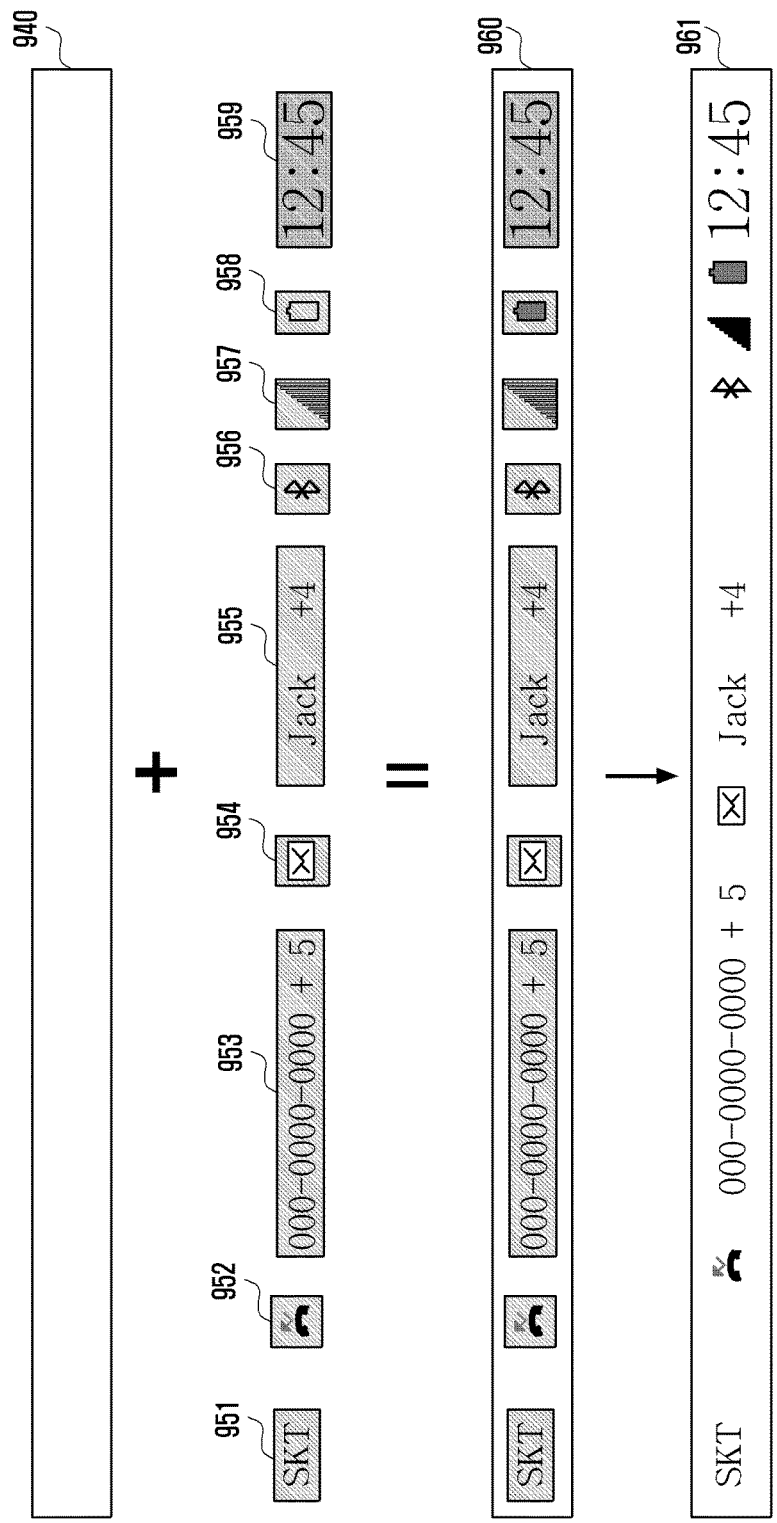

Referring to FIG. 9D, a process is illustrated for synthesizing the background image and the partial image to obtain and display a final image. The background image may be a notification (or status) bar 940. In an embodiment of the present disclosure, the partial image may be updated and displayed in the notification bar 940. For example, the partial images 951, 952, 953, 954, 955, 956, 957, 958 and 959 may be data formed of pixels to be displayed in the notification bar. Such partial images may be transmitted to the first processor at a specific time point. This time point may include a time point when information displayed on the display is changed, a time point when the display is turned on, or a time point when the display enters a sleep mode. In an embodiment of the present disclosure, the partial image is newly displayed at a partial region of the display with lower power than displayed at the entire region. When any display request occurs, the first processor may perform synthesizing operation as shown in screenshot 960 and then control a display of the final image 961 by adjusting the transparency of the partial image.

Figure 9E:
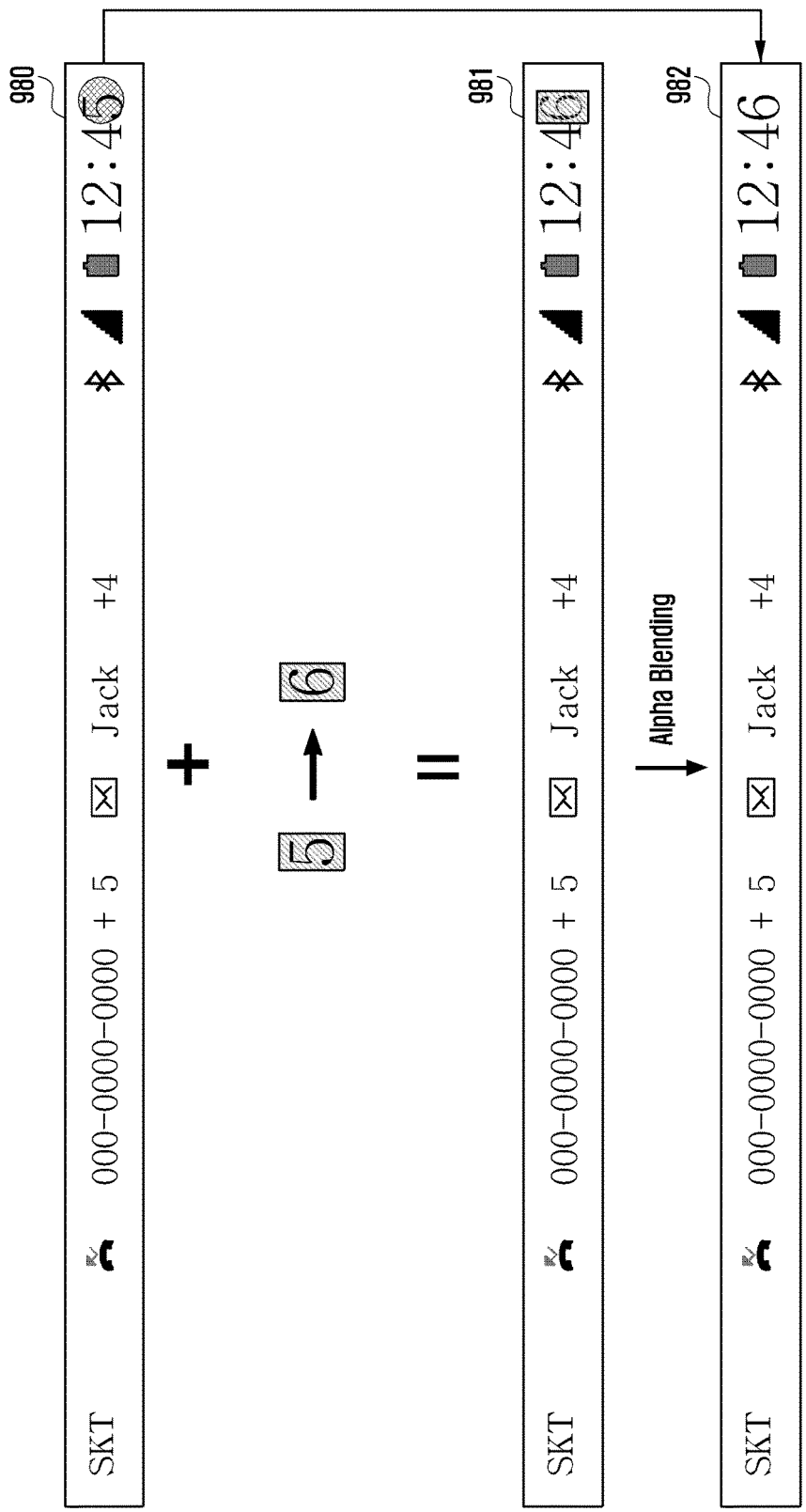

Referring to FIG. 9E, a process is illustrated for synthesizing the background image and the partial image to obtain and display a final image. While displaying a notification bar 980, the first processor may control a display of the screen in which the partial image forming the notification bar 980 is updated. For example, when the screen is displayed in response to the supply of power to the display, the notification bar 980 may display a watch. In an embodiment of the present disclosure, the second processor (e.g., MCU) may detect a change from 12:45 to 12:46. Then the second processor may control the first processor to update only a changed partial image 981 among the respective partial images.

The first processor may synthesize the background image (i.e., the notification bar 980) and the updated partial image 981. In an embodiment of the present disclosure, under the control of the second processor, the first processor may control a display of the final image 982 by adjusting the transparency of the partial image through the synthesizing module equipped therein.

Figure 9F:
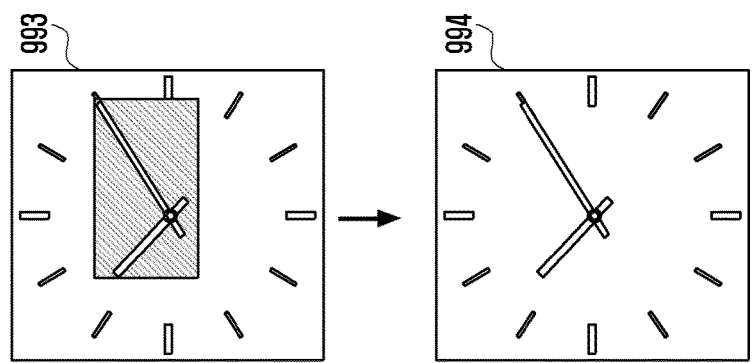
Figure 9F:
Figure 9F:
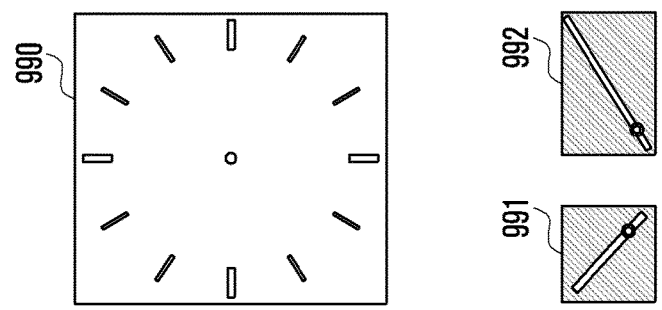

Referring to FIG. 9F, a process is illustrated for synthesizing the background image and the partial image to obtain and display a final image. The first processor may control a display of the screen. When any display request occurs, the background image may be updated to the first processor. In an embodiment of the present disclosure, the first processor may maintain a state of storing the background image. For example, the background image 990 may be the entire image for representing a watch screen. In an embodiment of the present disclosure, if a display signal is received from the input/output interface or the communication interface, the second processor may control the partial images 991 and 992 to be updated to the first processor. In an embodiment of the present disclosure, the first processor may synthesize the background image 990 and the partial images 991 and 992 as shown in screenshot 993. The first processor may control a display of the final image 994 by performing alpha blending process to adjust transparency of the partial images 991 and 992.

Figure 10:
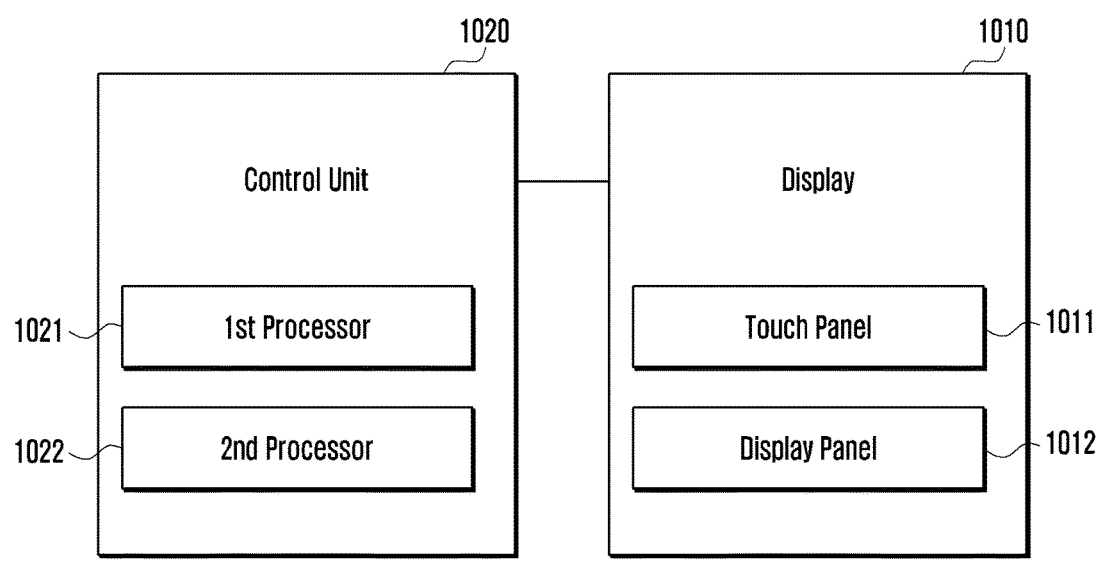
FIG. 10 is a block diagram of an electronic device according to various embodiments of the present disclosure.

FIG. 10 is a block diagram of an electronic device according to various embodiments of the present disclosure.

Referring to FIG. 10, the electronic device may include, but not limited to, a control unit 1020 and a display 1010. In various embodiments of the present disclosure, any other element such as a wireless communication unit, a camera unit, and/or the like may be further included.

The display 1010 may include a touch panel 1011 and a display panel 1012.

The touch panel 1011 may detect a user input from the surface thereof. In response to the detected user input, the touch panel 1011 may create sensing information and deliver the sensing information to the control unit 1020.

The display panel 1012 may be an LCD, an AMOLED, a flexible display, or a transparent display. The display panel 1012 may display an application window on the whole or part of the screen under the control of the control unit 1020. The application window which is an image displayed on the screen in response to the execution of a corresponding application may be a photo, a webpage, a memo window, an e-book page, a preview image of camera, and the like. When a display request signal occurs, the display panel 1012 may display the screen with power turned on. Further, in response to the above signal, the display panel 1012 may display the final image in which the background image and the partial image are synthesized.

The display panel 1012 may include the above-discussed DDI as a display control processor. In an embodiment of the present disclosure, the display control processor may be contained in the control unit 1020. The display control processor may be an IC chip capable of controlling the display 1010 and control a driving signal and data to display an image or video on the display panel 1012. The display control processor may include a controller and a memory (e.g., GRAM). When a signal for driving the display occurs, the display control processor may display the final image through the controller.

The control unit 1020 may include the first processor 1021 and the second processor 1022. In an embodiment of the present disclosure, the first processor 1021 may be the above-discussed AP, and the second processor 1022 may be the above-discussed MCU. In an embodiment of the present disclosure, the first processor may be the MCU, and the second processor may be the DDI. In an embodiment of the present disclosure, the first processor may be the AP, and the second processor may be the DDI.

As discussed hereinbefore, the method and apparatus for controlling a display according to various embodiments of this disclosure may minimize unnecessary wakeup by using the existing resources of a displayed image. Additionally, by updating the minimum image only to the existing resources through a separate processor, it is possible to control a display with lower power.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus for controlling a display in an electronic device, the apparatus comprising:
   a display configured to display a screen image formed by a first vector information and a second image, the first vector information corresponding to a partial region of the screen image, and the second image corresponding to a background region of the screen image;
   a first processor, which comprises an application processor (AP) and is configured to transmit the first vector information and the second image to a second processor in response to a request for displaying the screen image on the display in a sleep state of the first processor; and
   the second processor, which comprises a controller unit and is distinguished from the first processor, and is configured to:
      store the first vector information and the second image in a memory of the second processor,
      generate the screen image using the first vector information and the second image in the sleep state of the first processor, and
      transmit the screen image to a display processor which is configured to drive the display to display the screen image in the sleep state of the first processor.

2. The apparatus of claim 1, wherein the second processor is integral to the first processor.

3. The apparatus of claim 1, wherein the first processor is further configured to transmit the first vector information to the second processor when the first processor enters the sleep state.

4. The apparatus of claim 1, wherein the memory is configured to store the first vector information and the second image, and
   wherein the first vector information includes header information and pixel information.

5. The apparatus of claim 4, wherein the second processor is further configured to determine the partial region corresponding to the first vector information based on the header information, vector information, and the pixel information.

6. The apparatus of claim 1, wherein one of the first processor or the second processor is further configured to:
   connect to an external electronic device, and
   control the external electronic device to display the first vector information and the second image.

7. The apparatus of claim 1, wherein the display includes two displays.

8. The apparatus of claim 1, wherein the second processor is further configured to store the second image before receiving the first vector information.

9. A method for controlling a display in an electronic device, the method comprising:
   receiving, by a first processor which comprises an application processor (AP), a request for displaying a screen image formed of a first vector information and a second image in a sleep state of the first processor, the first vector information corresponding to a partial region of the screen image, and the second image corresponding to a background region of the screen image;

in response to the request, transmitting the first vector information and the second image from the first processor to a second processor, wherein the second processor comprises a controller unit and is distinguished with the first processor;

storing, by the second processor, the second image in a memory of the second processor;

generating, by the second processor, the screen image using the first vector information and the second image in the sleep state of the first processor; and transmitting the screen image from the second processor to a display processor which is configured to drive the display to display the screen image in the sleep state of the first processor.

10. The method of claim 9,
wherein the first vector information includes header information and pixel information, and
wherein the displaying of the first vector information together with the second image further comprises determining, by the second processor, the partial region corresponding to the first vector information based on the header information, vector information, and the pixel information.

11. The method of claim 9, further comprising:
connecting, by one of the first processor or the second processor, to an external electronic device; and
controlling, by one of the first processor or the second processor, the external electronic device to display the first vector information and the second image.

12. An apparatus for controlling a display in an electronic device, the apparatus comprising:
a display configured to display a screen image formed by a first vector information and a second image, the first vector information corresponding to a partial region of the screen image, and the second image corresponding to a background region of the screen image;
a first processor, which comprises an application processor (AP) and is configured to transmit the first vector information to a second processor in response to a request for displaying the screen image on the display in a sleep state of the first processor;
the second processor, which comprises a controller unit and is distinguished with the first processor, is configured to periodically transmit the first vector information to a display processor for displaying the screen image on the display in the sleep state of the first processor; and
the display processor is configured to generate the screen image using the first vector information and the second image in the sleep state of the first processor, and drive the display to display the screen image in the sleep state of the first processor.

13. The apparatus of claim 12, wherein the second processor is integral to the first processor.

14. The apparatus of claim 12, wherein the first processor is further configured to transmit the first vector information to the second processor when the first processor enters the sleep state.

15. The apparatus of claim 12, further comprising a memory configured to store the first vector information and the second image,
wherein the first vector information includes header information and pixel information.

16. The apparatus of claim 15, wherein the second processor is further configured to determine the partial region corresponding to the first vector imago information based on the header information, vector information, and the pixel information.

17. The apparatus of claim 12, wherein one of the first processor or the second processor is further configured to:
connect to an external electronic device, and
control the external electronic device to display the first vector information and the second image.

18. The apparatus of claim 12, wherein the display includes two displays.

19. The apparatus of claim 12, wherein the second processor is further configured to store the second image before receiving the first vector information.

* * * * *